(12) United States Patent
Kobayashi

(10) Patent No.: US 6,687,200 B1
(45) Date of Patent: Feb. 3, 2004

(54) RECORDING/REPRODUCING APPARATUS FOR RECORDING DATA IN RECORDING PITS

(75) Inventor: Takao Kobayashi, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 611 days.

(21) Appl. No.: 09/598,699

(22) Filed: Jun. 21, 2000

(30) Foreign Application Priority Data

Jun. 23, 1999 (JP) .......................... 11-176208
Dec. 22, 1999 (JP) .......................... 11-363944

(51) Int. Cl.$^7$ ............................................ G11B 7/095
(52) U.S. Cl. .......................... 369/44.26; 369/13.11; 369/13.55; 369/275.4
(58) Field of Search ................. 369/13.11, 13.55, 369/44.13, 44.26, 44.41, 44.37–44.38, 275.2, 275.4

(56) References Cited

U.S. PATENT DOCUMENTS

| | | | |
|---|---|---|---|
| 4,744,070 A | * 5/1988 | Takemura et al. | 369/44.26 |
| 5,199,090 A | 3/1993 | Bell | |
| 5,451,762 A | * 9/1995 | Hayashi | 235/487 |
| 5,602,820 A | 2/1997 | Wickramasinghe et al. | |
| 5,633,845 A | * 5/1997 | Horiguchi | 369/44.26 |
| 5,991,259 A | * 11/1999 | Nakayama et al. | 369/275.4 |
| 6,069,870 A | * 5/2000 | Maeda et al. | 369/275.4 |
| 6,292,458 B1 | * 9/2001 | Eguchi et al. | 369/275.3 |

FOREIGN PATENT DOCUMENTS

| | | |
|---|---|---|
| JP | 8-249668 | 9/1996 |
| JP | 8-279158 | 10/1996 |
| JP | 8-321084 | 12/1996 |
| JP | 9-326130 | 12/1997 |

* cited by examiner

Primary Examiner—W. R. Young
(74) Attorney, Agent, or Firm—Morrison & Foerster, LLP

(57) ABSTRACT

A recording/reproducing apparatus is configured to displace near-field light for recording or reproduction and tracking illumination light toward an outer periphery of a recording pit when an off-track state toward the outer periphery occurs. The amount of reflected tracking illumination light increases since the reflectivity of an outer peripheral track band is higher than that of a recording region and that of an inner peripheral track band. The near-field light and the tracking illumination light are displaced toward an inner periphery of a recording pit when an off-track state toward the inner periphery occurs. The amount of reflected tracking illumination light decreases since the reflectivity of the inner peripheral track band is lower than that of the recording region and that of the outer peripheral track band. The single tracking illumination light is required for tracking control. The recording/reproducing apparatus can perform high-accuracy tracking control, is easy to manufacture, and is reduced in size.

20 Claims, 23 Drawing Sheets

F I G. 24
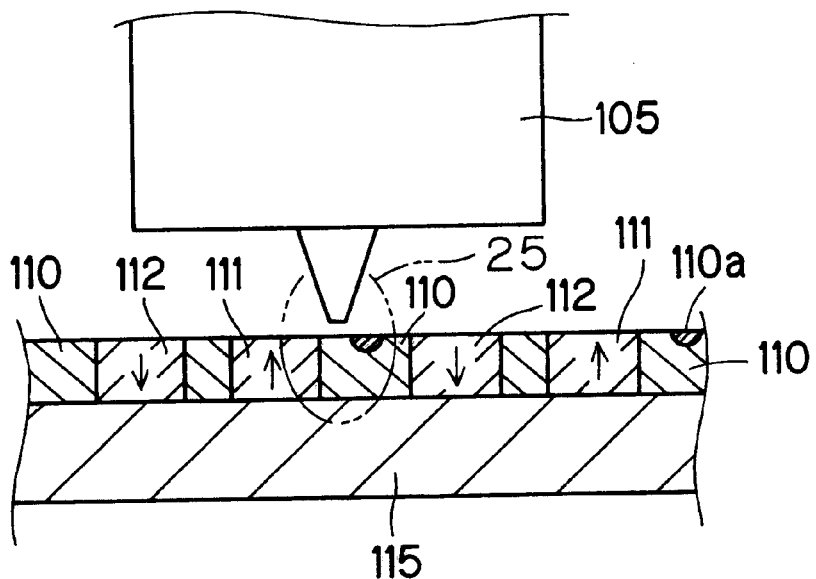
F I G. 25
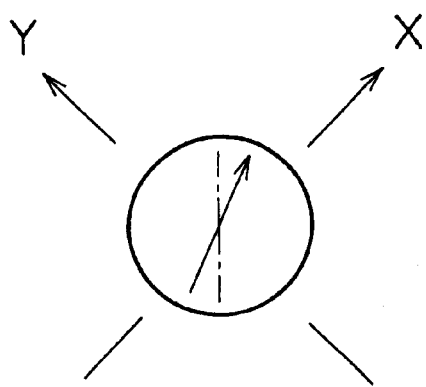

RECORDING/REPRODUCING APPARATUS FOR RECORDING DATA IN RECORDING PITS

This application is based on applications Nos. 11-363944 and 11-176208 filed in Japan, the contents of which are hereby incorporated by reference.

BACKGROUND OF THE INVENTION

1. Field of the Invention

The present invention relates to a recording medium, specifically to a disc-shaped recording medium on which rows of recording pits are recorded in a concentric or spiral pattern, and a recording/reproducing apparatus for performing a recording or reproducing operation upon the recording medium.

2. Description of the Background Art

In recent years, the amount of data handled by a computer and the like has been on the increase and, accordingly, new high-density recording techniques have been studied. Among the techniques, a recording/reproducing technique which utilizes near-field light (evanescent light) is one of the techniques which have attracted particular attention.

The spot diameter of the near-field light is determined by the size of an opening through which the near-field light penetrates into a near-field environment, independently of a wavelength being used (that is, without being restricted by a diffraction limit). Therefore, the near-field light having a minute diameter may be generated by making the opening less than the wavelength, and the use of this near-field light allows a higher-density recording or reproducing (reading) operation than the conventional technique.

For practical use of an apparatus which performs such a high-density recording and reproducing operation, a high-accuracy tracking technique is required to record data at a high density or to correctly reproduce the data recorded at the high density. For example, it is impossible to put the apparatus into practical use without the capability of a head to track minute recording pits arranged on a recording surface of a recording medium.

Conventional tracking techniques of this type are disclosed in Japanese Patent Application Laid-Open No. 7-225975 (1995), Japanese Patent Application Laid-Open No. 8-321084 (1996), and Japanese Patent Application Laid-Open No. 9-326130 (1997).

For instance, Japanese Patent Application Laid-Open No. 7-225975 discloses a technique such that tracking is performed by detecting pits in the form of wobbled marks (wobbled pits) for tracking servo by using a multiplicity of minute openings arranged in a linear array. In other words, a tracking signal is detected in a multiplicity of circumferential locations of a recording medium.

Japanese Patent Application Laid-Open No. 8-321084 discloses a technique such that tracking is performed by detecting tracking grooves by using a pair of tracking probes adjacent to the opposite ends of a sequence of recording or reproducing probes arranged linearly radially of a recording medium. Like reproducing probes, the tracking probes utilize the near-field light and therefore can achieve accurate position control in the direction of the width of tracks.

Japanese Patent Application Laid-Open No. 9-326130 discloses a method of detecting a tracking signal in such a manner that light is directed from a minute opening at the tip of each of three probes provided in a head in fixedly spaced apart relationship, and the light reflected from a row of recording pits is detected. This method uses a groove part detection signal from the probes disposed on the opposite ends to detect an off-track state, and provides feedback to the operation of the head, thereby achieving proper tracking.

The tracking method disclosed in Japanese Patent Application Laid-Open No. 7-225975 is required to provide a row of minute openings. However, it is very difficult to produce a multiplicity of contiguous openings of about tens of nanometers in size.

The tracking method disclosed in Japanese Patent Application Laid-Open No. 8-321084 requires the additional tracking probes on the opposite sides of the recording or reproducing probes. This increases the size of the head itself and requires the process of producing irregularities to form grooves in the recording medium.

The increase in the size of the head hinders the high-speed drive of the head. Additionally, this tracking method is required to space the pair of tracking probes about tens of nanometers apart from the sequence of recording or reproducing probes. However, it is also very difficult to produce such tracking probes. Moreover, it is difficult to produce the irregularities on the order of tens of nanometers in the surface of the recording medium with good reproducibility.

Similarly, the tracking method disclosed in Japanese Patent Application Laid-Open No. 9-326130 is required to produce the recording medium having irregularities corresponding to the probe units equally spaced on the order of tens of nanometers not greater than the wavelength apart from each other, resulting in great difficulties and increased costs. Furthermore, the fixed spacing between the probes presents another problem in that, when the same probe unit is used for recording and for reproduction, the width of tracks and groove parts of the recording medium are fixed depending on recording/reproducing apparatuses, resulting in the lack of flexibility.

SUMMARY OF THE INVENTION

The present invention is intended for a recording medium.

According to the present invention, the recording medium comprises: a recording region for recording a recording pit row; a first track band provided along the recording region; and a second track band provided along the recording region on the opposite side of the recording region from the first track band, the second track band having an optical responsivity different from that of the first track band.

Therefore, the recording medium is configured to distinguishably detect a deviation toward an inner periphery and a deviation toward an outer periphery, to achieve high-accuracy tracking control.

The present invention is also intended for a recording/reproducing apparatus for recording or reproducing a recording pit in or from a recording region of a recording medium, the recording medium further including a first track band and a second track band, the recording region being disposed between the first track band and the second track band, the first track band and the second track band being different in optical responsivity from each other.

According to the present invention, the recording/reproducing apparatus comprises: a reproducing light illumination device for directing reproducing light onto the recording pit; and a tracking light illumination device for directing tracking light onto the recording medium, the tracking light allowing the first track band and the second track band to be included in an illumination area thereof.

Therefore, the recording/reproducing apparatus can perform high-accuracy tracking, is easy to manufacture, and is reduced in size.

In accordance with one aspect of the present invention, in the recording/reproducing apparatus, the tracking light has a diameter greater than that of the reproducing light.

This allows high-density data recording or reproduction while achieving the high-accuracy tracking.

In accordance with another aspect of the present invention, the tracking light illumination device renders the tracking light coaxial with the reproducing light from the reproducing light illumination device to direct the tracking light onto the recording medium.

Therefore, the recording/reproducing apparatus can perform the tracking control using the position of the reproducing light as a center, to perform higher-accuracy tracking.

In accordance with still another aspect of the present invention, the reproducing light illumination device and the tracking light illumination device are formed integrally with each other.

This further reduces the size of the apparatus.

It is therefore an object of the present invention to provide a recording/reproducing apparatus which is capable of performing high-accuracy tracking, easy to manufacture, and reduced in size, and to provide a recording medium suitable for the recording/reproducing apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 24 illustrates a tracking operation;

FIG. 25 illustrates the plane of polarization of reflected light in the tracking operation of FIG. 24;

DESCRIPTION OF THE PREFERRED EMBODIMENTS

1. First Preferred Embodiment

A first preferred embodiment according to the present invention will now be described.

Figure 1:
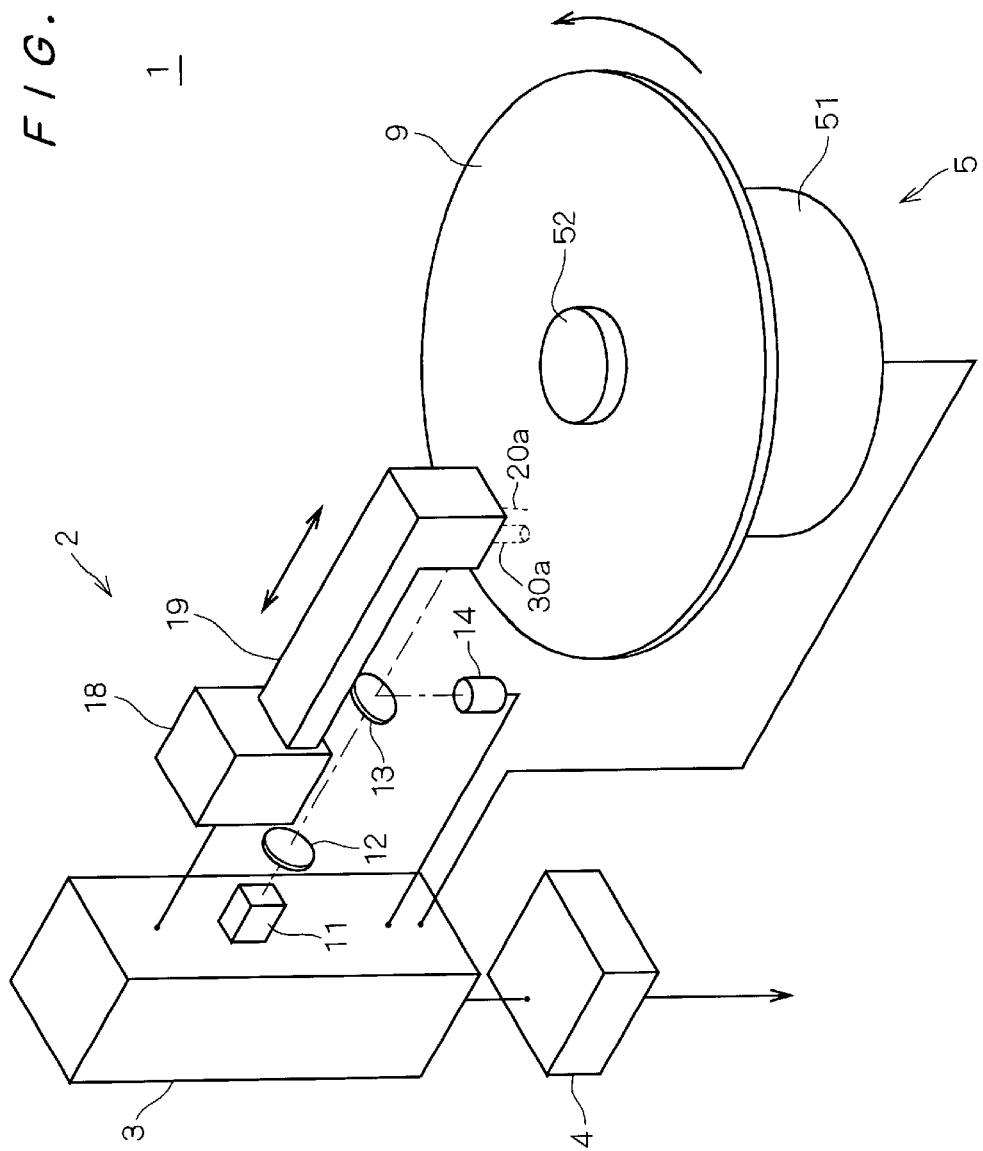
FIG. 1 is a schematic view showing a construction of a recording/reproducing apparatus according to preferred embodiments of the present invention.

FIG. 1 is a schematic view showing a construction of a recording/reproducing apparatus 1 according to the first preferred embodiment. The recording/reproducing apparatus 1 comprises a rotating mechanism 5 for rotating a recording medium 9 such as an optical disc in a predetermined direction while holding the recording medium 9 thereon; an optical head 2 for recording or reading (reproducing) a signal on or from a recording surface of the recording medium 9; a controller 3 for providing a drive control signal to the optical head 2 and the rotating mechanism 5; and a signal processor 4 for processing a recording signal or a reproducing signal for the recording medium 9.

The rotating mechanism 5 includes a rotation driver 51 and a rotating member 52. Based on the drive control signal from the controller 3, the rotation driver 51 rotates the rotating member 52 in a predetermined direction. The rotating member 52 is constructed to removably hold the recording medium 9 in a predetermined position, and rotates integrally with the recording medium 9 mounted thereto.

The optical head 2 comprises a laser light source 11, a collimator lens 12, a beam splitter 13, a photodetector 14, an optical head driver 18, and a holding member 19. The laser light source 11 is a light source for emitting light for recording on or reproduction from the recording medium 9, and is preferably a compact light source such as a semiconductor laser. The laser light source 11 is driven by a laser drive circuit not shown which is provided in the controller 3. The light emitted from the laser light source 11 is introduced through the collimator lens 12, the beam splitter 13 and the tip of the holding member 19 onto the recording medium 9.

The collimator lens 12 has the function of collimating the light emitted from the laser light source 11, and the beam splitter 13 allows the collimated light from the collimator lens 12 to pass therethrough. The light passing through the beam splitter 13 is converted by a near-field light generator device provided at the tip of the holding member 19 and to be described later into near-field light 20a which in turn is projected in the form of a minute spot onto the recording surface of the recording medium 9.

The near-field light 20a reflected from the recording medium 9 travels in the reverse direction, and returns from the near-field light generator device to the beam splitter 13. This light is reflected from the beam splitter 13 to enter the photodetector 14. Thus, the data recorded on the recording medium 9 is read by the photodetector 14.

The tip of the holding member 19 is provided with, in addition to the near-field light generator device, a fiber probe for directing tracking illumination light 30a to be described later into a position near the near-field light 20a. Whether the near-field light generator device in the optical head 2 is in an on-track state or not is detected by detecting the amount of the tracking illumination light 30a reflected from the recording medium 9.

The laser light source 11, the collimator lens 12, the beam splitter 13 and the photodetector 14 are fixed in respectively predetermined positions. The holding member 19 is driven by the optical head driver 18 to linearly move toward and away from the center of rotation of the recording medium 9. The controller 3 provides the drive control signal to the optical head driver 18 to control the position of the holding member 19, i.e., the position of the near-field light generator device with respect to the recording medium 9. Therefore, the control of the position of the near-field light generator device with respect to the recording medium 9 based on the amount of the reflected tracking illumination light 30a allows tracking control during the recording or reproducing operation of the recording medium 9.

The drive mechanism of the optical head 2 need not always be designed to linearly move toward and away from the center of rotation of the recording medium 9, but may be designed such that a holding member of a predetermined length is pivoted toward and away from the center of rotation.

The signal processor 4 has the functions of providing data to be recorded on the recording medium 9 through the controller 3 to the laser drive circuit, and receiving read data (reproduced data) detected by the photodetector 14 through the controller 3 to output the data to other data processing equipment.

Figure 2:
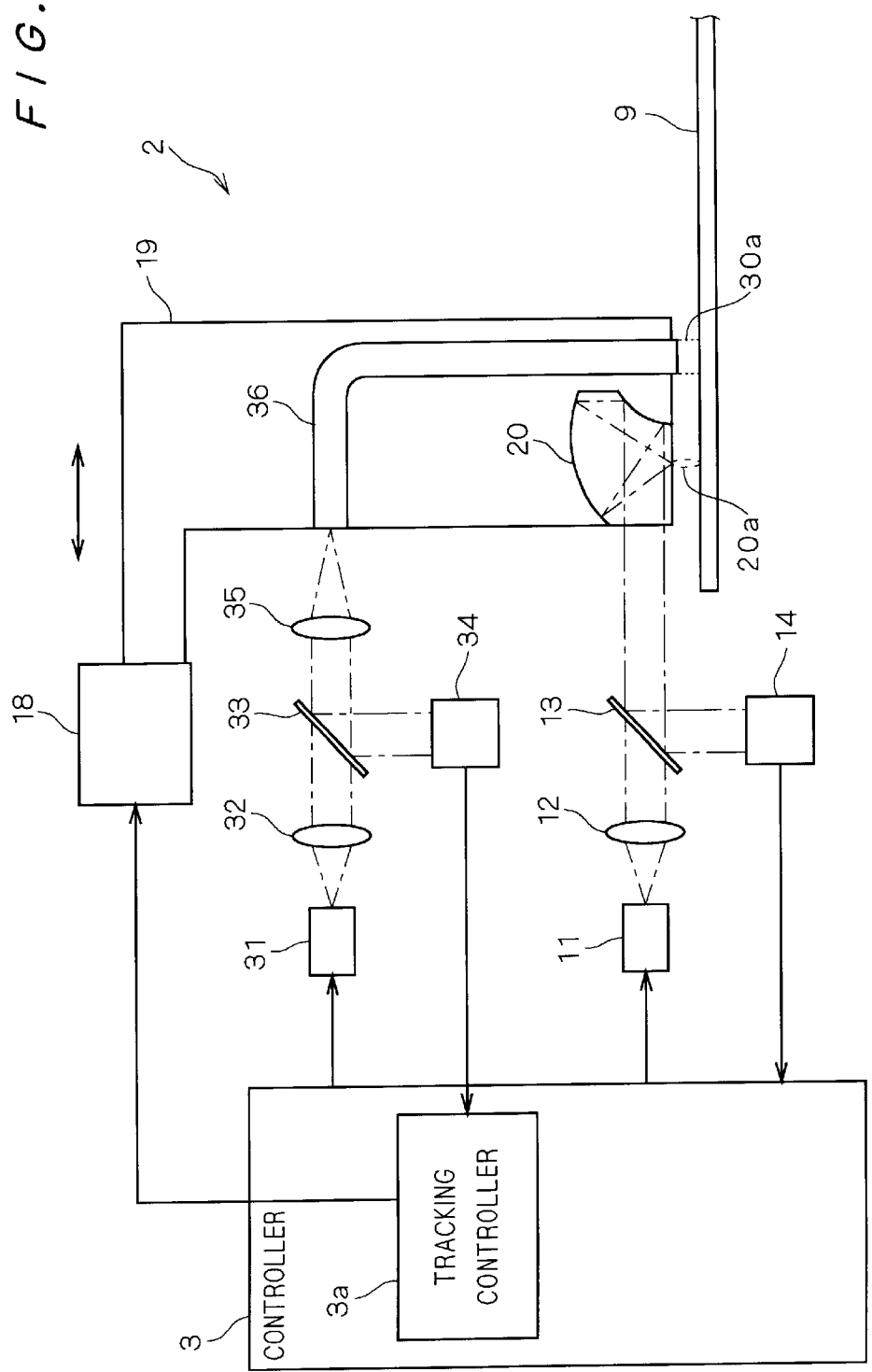
FIG. 2 is a conceptual view of constituents of an optical head according to a first preferred embodiment of the present invention.

FIG. 2 is a conceptual view of constituents of the optical head 2 shown in FIG. 1. The tip of the holding member 19 is provided with the near-field light generator device 20 and the fiber probe 36. The near-field light generator device 20 projects the near-field light 20a having a minute spot diameter onto the recording medium 9, and the fiber probe 36 projects the tracking illumination light 30a onto the recording medium 9. In other words, the near-field light generator device 20 acts as a near-field optical means for directing the near-field light 20a for recording or reproduction onto the recording medium 9 or detecting the near-field light 20a, and the fiber probe 36 acts as an illumination means for directing onto the recording medium 9 the tracking illumination light 30a having a diameter greater than that of the near-field light 20a.

Figure 3:
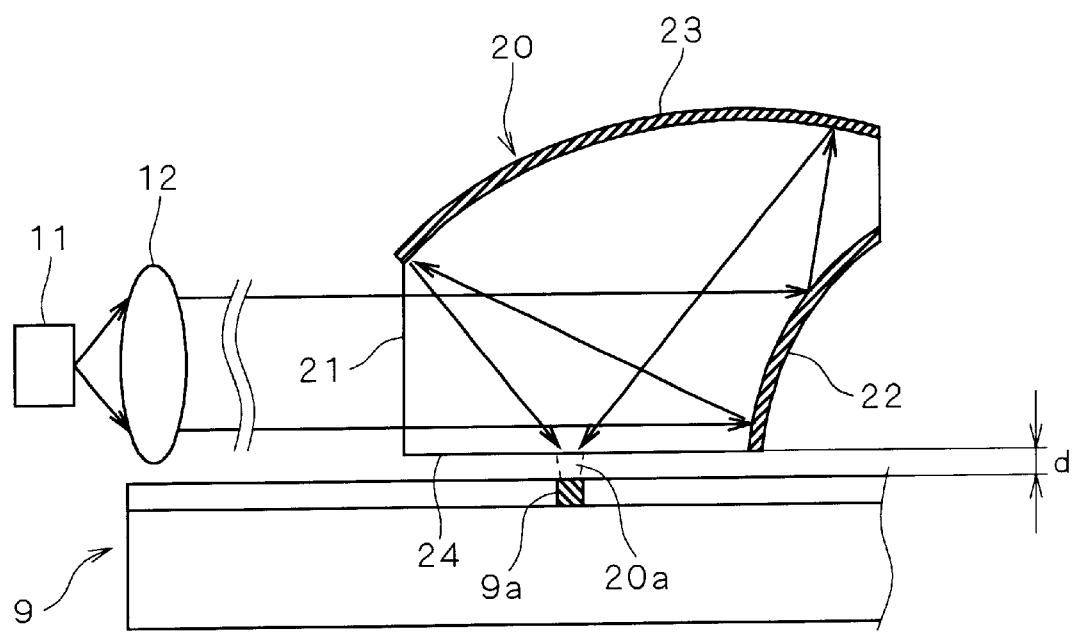
FIG. 3 shows a near-field light generator device.

FIG. 3 shows the near-field light generator device 20. The near-field light generator device 20 is formed of a high-refractive-index material, e.g., glass such as LaSF, LaF and BaSF, and includes a light incident surface 21, a first internal reflection surface 22, a second internal reflection surface 23, and a light exiting surface 24. The light incident surface 21 and the light exiting surface 24 are planar surfaces. The first internal reflection surface 22 is a paraboloidal surface, and the second internal reflection surface 23 is a spheroidal surface.

The light emitted from the laser light source 11 and collimated by the collimator lens 12 enters the near-field light generator device 20 at the light incident surface 21. The incident light is reflected once from the internal reflection surface 22 and once from the internal reflection surface 23, and focused to one point on the light exiting surface 24. As a result, a minute spot is formed near the light exiting surface 24 in the near-field light generator device 20. A gap (spacing) d between the light exiting surface 24 of the near-field light generator device 20 and the recording medium 9 is set within a near-field region which is not greater than one-quarter of the wavelength, whereby the near-field light 20a penetrates in the form of the minute spot from the light exiting surface 24 into a near-field environment. This penetrating near-field light 20a is used to form recording pits 9a on the recording surface of the recording medium 9 or to read the recording pits 9a formed on the recording surface. This accomplishes the recording of data at a high density on the recording medium 9 or the reproduction of the data recorded at the high density.

For example, the principle of air film lubrication is used to hold a magnetic disc head and the like at a distance of tens of nanometers from the recording surface. Such a technique of the magnetic disc head and the like may be applied to the holding member 19 (See FIG. 1) of the optical head 2 to allow the gap d between the light exiting surface 24 of the near-field light generator device 20 and the recording medium 9 to be held at not greater than one-quarter of the wavelength.

With the arrangement of the first preferred embodiment, the light incident on the near-field light generator device 20 is reflected once from the internal reflection surface 22 and once from the internal reflection surface 23 to form the minute spot. This eliminates the need to additionally provide a lens for focusing. Additionally, the light is directed into the near-field light generator device 20 in a horizontal direction (in a direction parallel to the recording surface of the recording medium 9). This reduces the size and thickness of the optical head 2.

Referring again to FIG. 2, according to the first preferred embodiment, the optical head 2 further comprises a laser light source 31, a collimator lens 32, a beam splitter 33, a condenser lens 35, and a signal detector (signal detection means) 34 all of which are provided for introducing tracking light into the fiber probe 36 to detect a tracking signal.

The laser light source 31 is a light source for tracking and includes a semiconductor laser or the like. The laser light source 31 is driven by a laser drive circuit not shown which is provided in the controller 3. The collimator lens 32 collimates the light emitted from the laser light source 31. The collimated light passes through the beam splitter 33 into the condenser lens 35. The light focused by the condenser lens 35 is introduced into the fiber probe 36. The light which enters the fiber probe 36 at its first end (light incident end) is introduced to the tip of the holding member 19 to exit the fiber probe 36 at its second end (light exiting end) disposed near the near-field light generator device 20 in the form of the tracking illumination light 30a. The tracking illumination light 30a has a spot diameter greater than that of the near-field light 20a, and the second end is fixed at the tip of the holding member 19 so as to be positioned on the same recording pit row as a recording pit 9a recorded or reproduced by the near-field light 20a.

The tracking illumination light 30a reflected from an illumination area of the recording medium 9 travels in the reverse direction, passes through the fiber probe 36, is reflected from the beam splitter 33, and is introduced into the signal detector 34. The signal detector 34 includes a light detection device such as a photodiode, and measures the amount of the tracking illumination light 30a reflected from the illumination area. The amount of the reflected light measured by the signal detector 34 is applied as the tracking signal to a tracking controller 3a in the controller 3.

The tracking controller 3a is a control means for tracking, and provides a drive instruction to the optical head driver 18, based on the amount of reflected light provided from the signal detector 34.

The construction of the recording medium 9 will be described.

Figure 4:
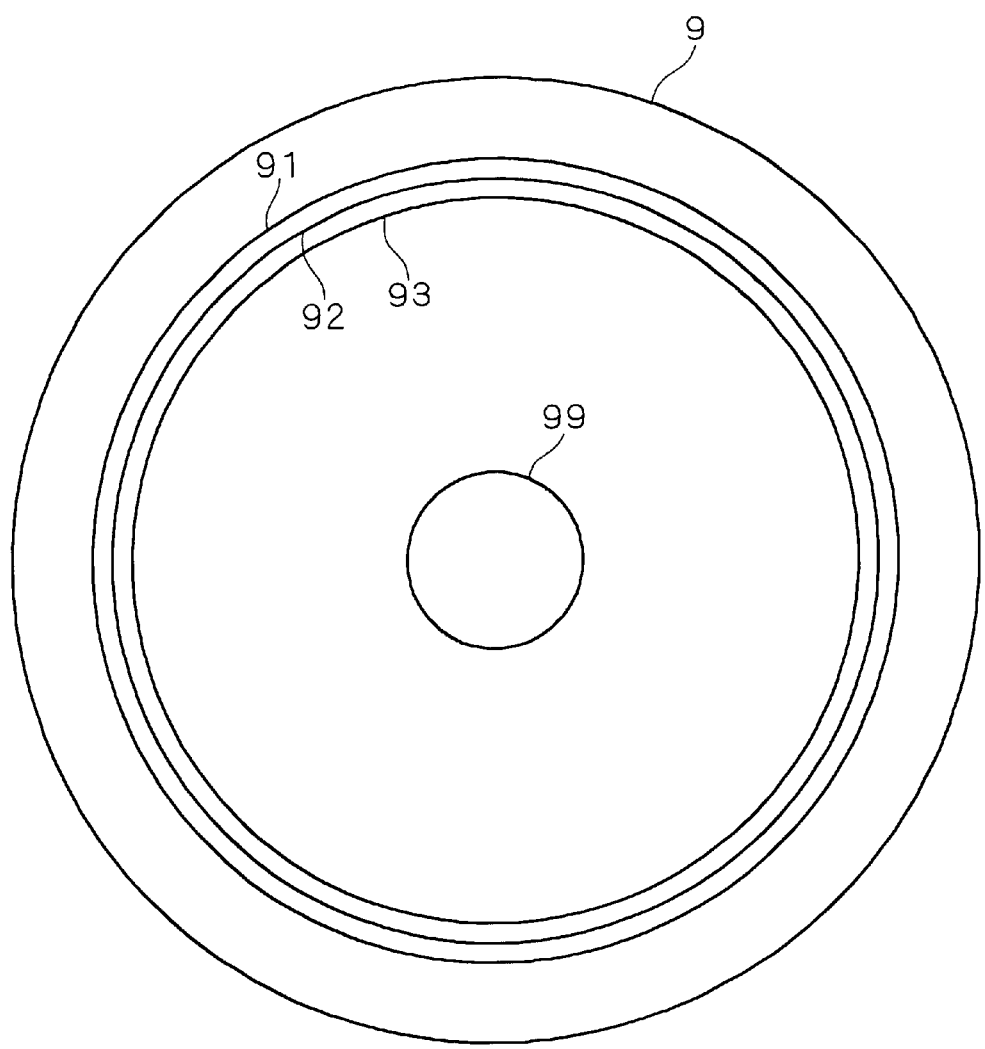
FIG. 4 is a plan view showing a recording form of a recording medium.

FIG. 4 is a plan view showing a recording form of the recording medium 9. The recording medium 9 is disc-shaped, and has a hole 99 disposed centrally thereof for allowing the rotating member 52 to hold the recording medium 9. Individual recording pits 9a are formed in each of concentric recording pit rows 92 (although the single recording pit row 92 is shown in FIG. 4) to record data on the recording medium 9. An outer peripheral track band (first track band) 91 is formed on the outer periphery of the single recording pit row 92, and an inner peripheral track band (second track band) 93 is formed on the inner periphery thereof. The outer peripheral track band 91, the recording pit row 92, and the inner peripheral track band 93 form one annular recording band. The recording medium 9 has a multiplicity of repeatedly formed recording bands each comprised of the outer peripheral track band 91, the recording pit row 92 and the inner peripheral track band 93.

Figure 5:
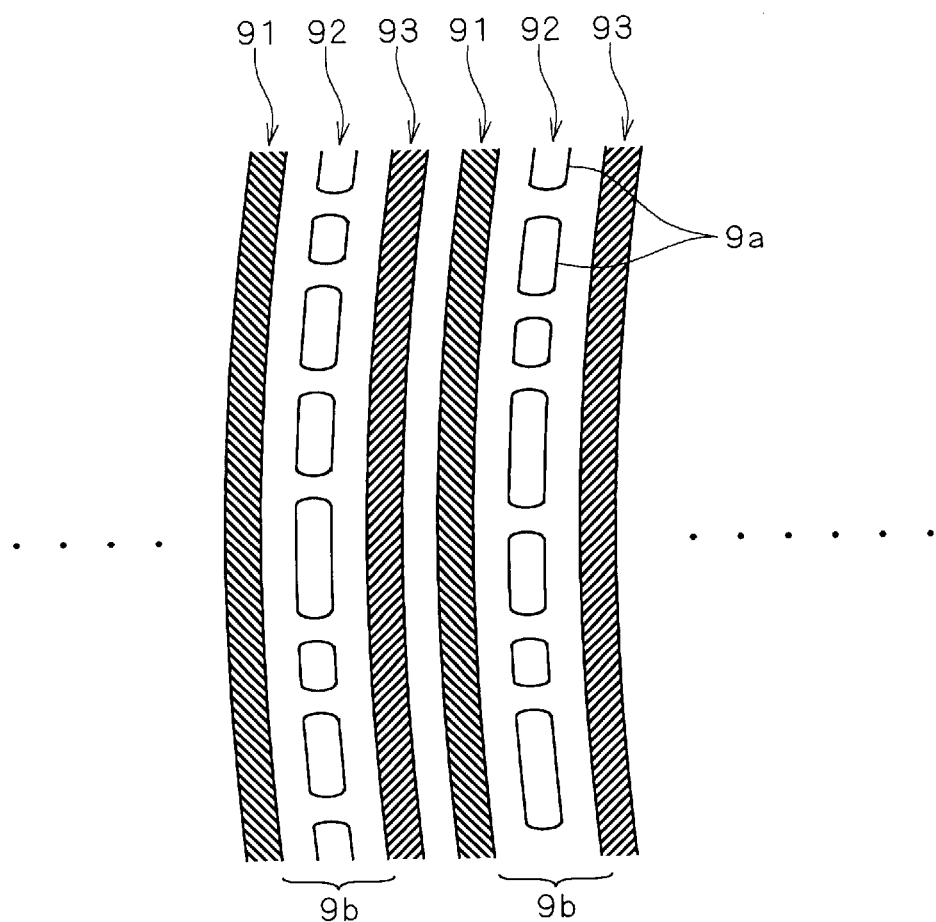
FIG. 5 is a conceptual view of recording bands of the recording medium.

FIG. 5 is a conceptual view of the recording bands of the recording medium 9. As illustrated in FIG. 5, the outer peripheral track band 91 is a continuously extending annular band having a predetermined width. The inner peripheral track band 93 is also a continuously extending annular band having a predetermined width. On the other hand, the recording pits 9a corresponding to recorded data are intermittently formed in the recording pit row 92. The recording pit row 92 is formed substantially in the middle of a recording region 9b between the outer peripheral track band 91 and the inner peripheral track band 93.

Figure 6:
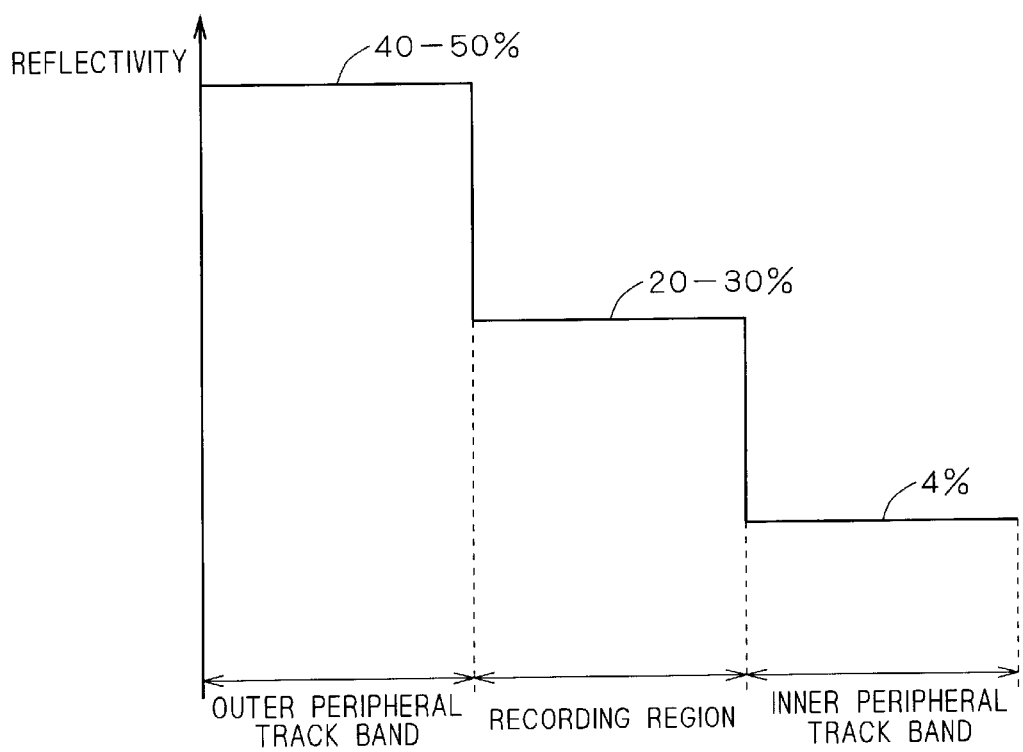
FIG. 6 shows reflectivities of a recording band for tracking illumination light.

FIG. 6 shows reflectivities of the recording band for the tracking illumination light. The outer peripheral track band 91 and the inner peripheral track band 93 are formed to exhibit different reflectivities for the tracking illumination light, and the recording region 9b is formed to exhibit a reflectivity which is between the reflectivities of the outer peripheral track band 91 and the inner peripheral track band 93. In the case shown in FIG. 6, the outer peripheral track band 91 exhibits a reflectivity of 40 to 50%, the recording region 9b in which the recording pits 9a are formed exhibits a reflectivity of 20 to 30%, and the inner peripheral track band 93 exhibits a reflectivity of about 4%.

A method of manufacturing such a recording medium 9 is discussed below. For example, an Al layer having a thickness of about 80 nm and a $TiO_2$ layer having a thickness of about 150 nm are formed on an $SiO_2$ substrate. Thereafter, a cyanine-based organic dye having a thickness of about 50 nm is deposited by spin coating to form the recording layers. The recording layer is etched by a photolithographic technique to expose the underlying layer. In this process, a portion corresponding to the outer peripheral track band 91, a portion corresponding to the recording region 9b, and a portion corresponding to the inner peripheral track band 93 are etched to different depths, to provide an exposed portion of the Al layer (corresponding to the outer peripheral track band), an exposed portion of the $TiO_2$ layer (corresponding to the recording region), and an exposed portion of the $SiO_2$ substrate (corresponding to the inner peripheral track band), respectively. Thus, the recording medium 9 is manufactured.

As described above, the recording medium 9 has the outer peripheral track band 91 extending on the outer periphery of and along the recording pit row 92, and the inner peripheral track band 93 extending on the inner periphery of and along the recording pit row 92 and having an optical responsivity different from that of the outer peripheral track band 91. The above-mentioned construction of the recording medium 9 allows high-accuracy tracking control using one tracking probe as will be described below.

Figure 7C:
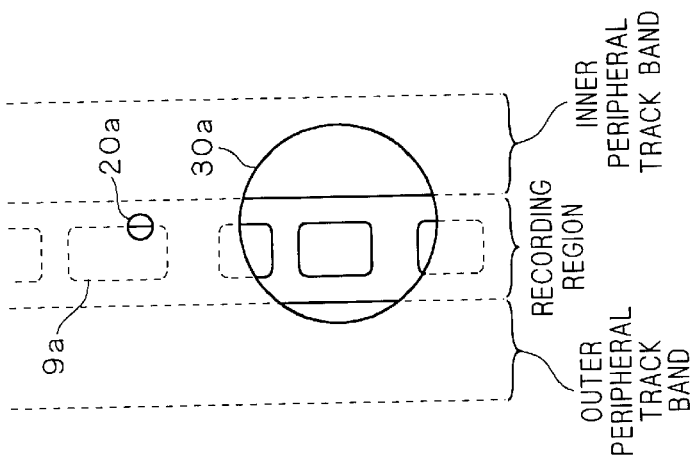
FIGS. 7A through 7C show the positions of near-field light and tracking illumination light exiting the optical head with respect to the recording band.
Figure 7B:
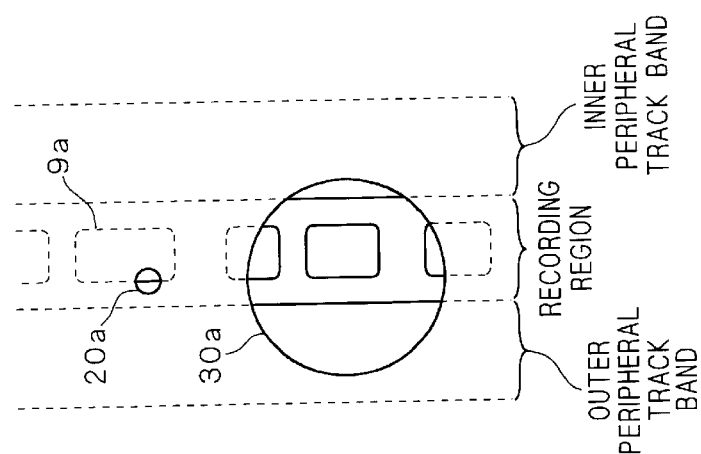
Figure 7A:
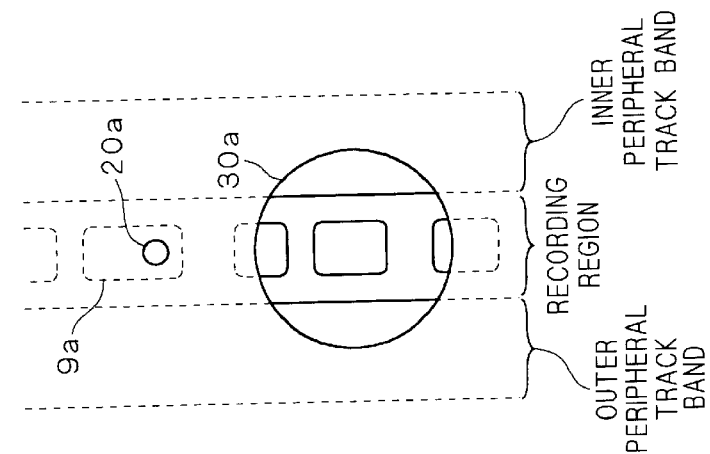

FIGS. 7A through 7C show the positions of the near-field light 20a and the tracking illumination light 30a which exit the optical head 2 of the recording/reproducing apparatus 1 with respect to the recording band. FIG. 7A illustrates the on-track state. FIG. 7B illustrates a deviation toward the outer periphery, and FIG. 7C illustrates a deviation toward the inner periphery.

The tracking illumination light 30a and the near-field light 20a are adapted to be positioned on the same recording pit row, as discussed above. Therefore, in the on-track state, the near-field light 20a is correctly introduced onto the middle of one of the recording pits 9a, and the tracking illumination light 30a is positioned so that parts of the outer and inner peripheral track bands which are approximately equal in area are included in the illumination area at its opposite sides, and part of the recording region is included in the illumination area at its middle (See FIG. 7A).

In the case of the deviation toward the outer periphery, on the other hand, the near-field light 20a is deviated toward the outer periphery of the recording pit 9a and the tracking illumination light 30a is also deviated toward the outer periphery thereof (See FIG. 7B). The reflectivity of the outer peripheral track band is higher than that of the recording region and that of the inner peripheral track band, and the area of the outer peripheral track band which is included in the illumination area of the tracking illumination light 30a increases in the case of the deviation toward the outer periphery. Therefore, the amount of the reflected tracking illumination light 30a increases.

In the case of the deviation toward the inner periphery, the near-field light 20a is deviated toward the inner periphery of the recording pit 9a and the tracking illumination light 30a is also deviated toward the inner periphery thereof (See FIG. 7C). The reflectivity of the inner peripheral track band is lower than that of the recording region and that of the outer peripheral track band, and the area of the inner peripheral track band which is included in the illumination area of the tracking illumination light 30a increases in the case of the deviation toward the inner periphery. Therefore, the amount of the reflected tracking illumination light 30a decreases.

Figure 8A:
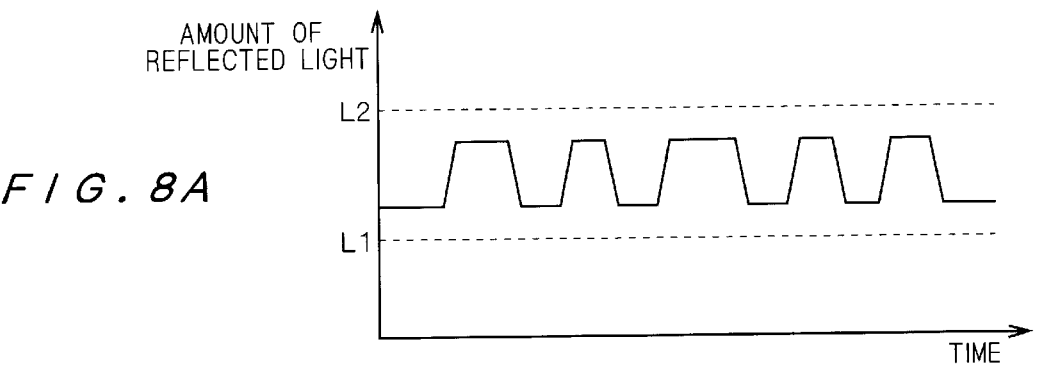
FIGS. 8A through 8C show the relationship between the amount of reflected tracking illumination light and time.
Figure 8B:
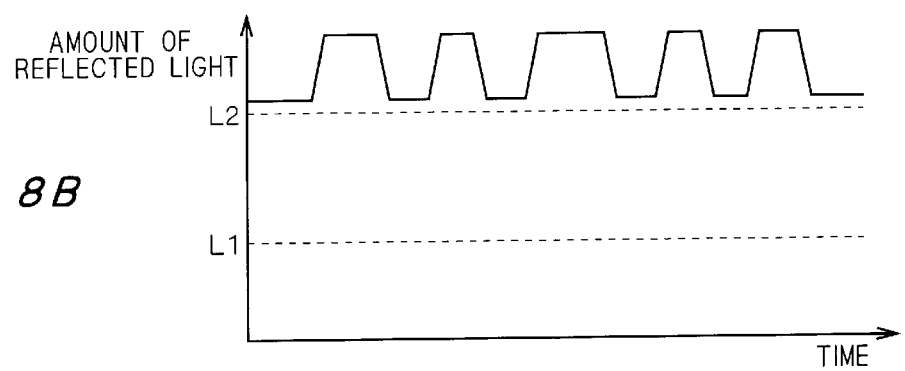
Figure 8C:
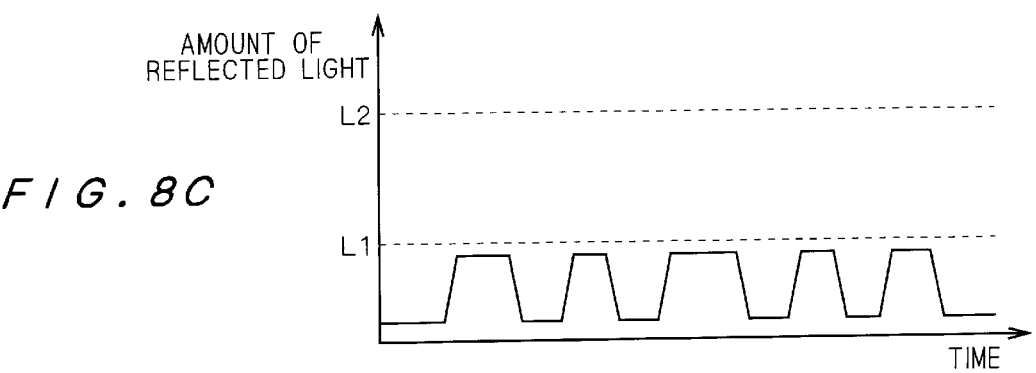

FIGS. 8A through 8C show the relationship between the amount of the reflected tracking illumination light 30a and time. FIG. 8A illustrates the on-track state. FIG. 8B illustrates the deviation toward the outer periphery, and FIG. 8C illustrates the deviation toward the inner periphery.

As illustrated in FIG. 8A, when the optical head 2 scans the recording medium 9 in the on-track state, the amount of the reflected tracking illumination light 30a is varied as the recording pits 9a move but takes on a value which is between predetermined threshold values L1 and L2. Specifically, since the signal detector 34 detects the amount of the tracking illumination light 30a reflected from within the illumination area, the amount of light reflected from the outer peripheral track band and the amount of light reflected from the inner peripheral track band have predetermined constant values, respectively, in the on-track state. Setting the threshold values L1 and L2 in accordance with the constant values allows the amount of the reflected tracking illumination light 30a to take on the value which is between the threshold values L1 and L2 in the on-track state.

In the case of the deviation toward the outer periphery, on the other hand, the amount of the reflected tracking illumination light 30a takes on a value greater than the predetermined threshold value L2, as illustrated in FIG. 8B. This results from the fact that the deviation toward the outer periphery increases the proportion of the high-reflectivity outer peripheral track band which is included in the illumination area of the tracking illumination light 30a.

Conversely, in the case of the deviation toward the inner periphery, the amount of the reflected tracking illumination light 30a takes on a value less than the predetermined threshold value L1, as illustrated in FIG. 8C. This results from the fact that the deviation toward the inner periphery decreases the proportion of the high-reflectivity outer peripheral track band which is included in the illumination area of the tracking illumination light 30a and increases the proportion of the low-reflectivity inner peripheral track band which is included in the illumination area.

The tracking controller 3a of the recording/reproducing apparatus 1 can judge whether or not the near-field light generator device 20 is in the on-track state by previously setting the threshold values L1 and L2 therein and examining whether or not the amount of the reflected tracking illumination light 30a provided from the signal detector 34 ranges between the threshold values L1 and L2.

Thus, the tracking controller 3a according to the first preferred embodiment functions as a control means for tracking control in accordance with the amount of reflected tracking illumination light 30a. More specifically, if the amount of the reflected tracking illumination light 30a is greater than the threshold value L2, the tracking controller 3a judges that the optical head 2 is deviated toward the outer periphery and provides the drive instruction to the optical head driver 18 so as to move the tip of the holding member 19 toward the inner periphery of the recording medium 9. On the other hand, if the amount of the reflected tracking illumination light 30a is less than the threshold value L1, the tracking controller 3a judges that the optical head 2 is deviated toward the inner periphery and provides the drive instruction to the optical head driver 18 so as to move the tip of the holding member 19 toward the outer periphery of the recording medium 9.

Under the above-mentioned control, the tip of the holding member 19, i.e. the near-field light 20a generated by the near-field light generator device 20, can scan the recording medium 9 while always correctly tracking the recording pit row.

As described hereinabove, the use of the recording/reproducing apparatus 1 and the recording medium 9 described in the first preferred embodiment allows high-accuracy tracking, easy manufacture of the apparatus and the size reduction of the apparatus.

This is because the recording medium 9 comprises the outer peripheral track band having a reflectivity higher than that of the recording region in which the recording pit row is formed and disposed on the outer periphery of the recording region, and the inner peripheral track band having a reflectivity lower than that of the recording region and disposed on the inner periphery of the recording region. Therefore, correct tracking is achieved only by directing onto the recording medium 9 the tracking illumination light 30a which permits the outer peripheral track band, the recording region and the inner peripheral track band to be included within the illumination area thereof. In other words, since the recording medium 9 has the track bands having different optical responsivities on the outer and inner peripheries of the recording pit row, even the single fiber probe can correctly detect the tracking control signal during the tracking operation.

The recording/reproducing apparatus 1 eliminates the need to provide a plurality of probes for tracking. This simplifies the construction of the apparatus 1, to facilitate the manufacture thereof and achieve the size reduction thereof.

In the above description, the reflectivity of the outer peripheral track band is higher than that of the recording region, and the reflectivity of the recording region is higher than that of the inner peripheral track region. However, similar functions and effects are, of course, produced when these reflectivities are in inverse relationship. In this case, the control operation in the tracking controller 3a is also accordingly inverted. That is, if the amount of the reflected light is greater than the threshold value L2, the tracking controller 3a judges that the optical head 2 is deviated toward the inner periphery and provides the drive instruction so as to move the holding member 19 toward the outer periphery. On the other hand, if the amount of the reflected light is less than the threshold value L1, the tracking controller 3a judges that the optical head 2 is deviated toward the outer periphery and provides the drive instruction so as to move the holding member 19 toward the inner periphery.

2. Second Preferred Embodiment

A second preferred embodiment according to the present invention will be described.

In the second preferred embodiment, the near-field light 20a and the tracking illumination light 30a are directed in coaxial relationship with each other onto the recording medium 9. The recording medium 9 similar to that of the first preferred embodiment may be used in the second preferred embodiment.

Figure 9:
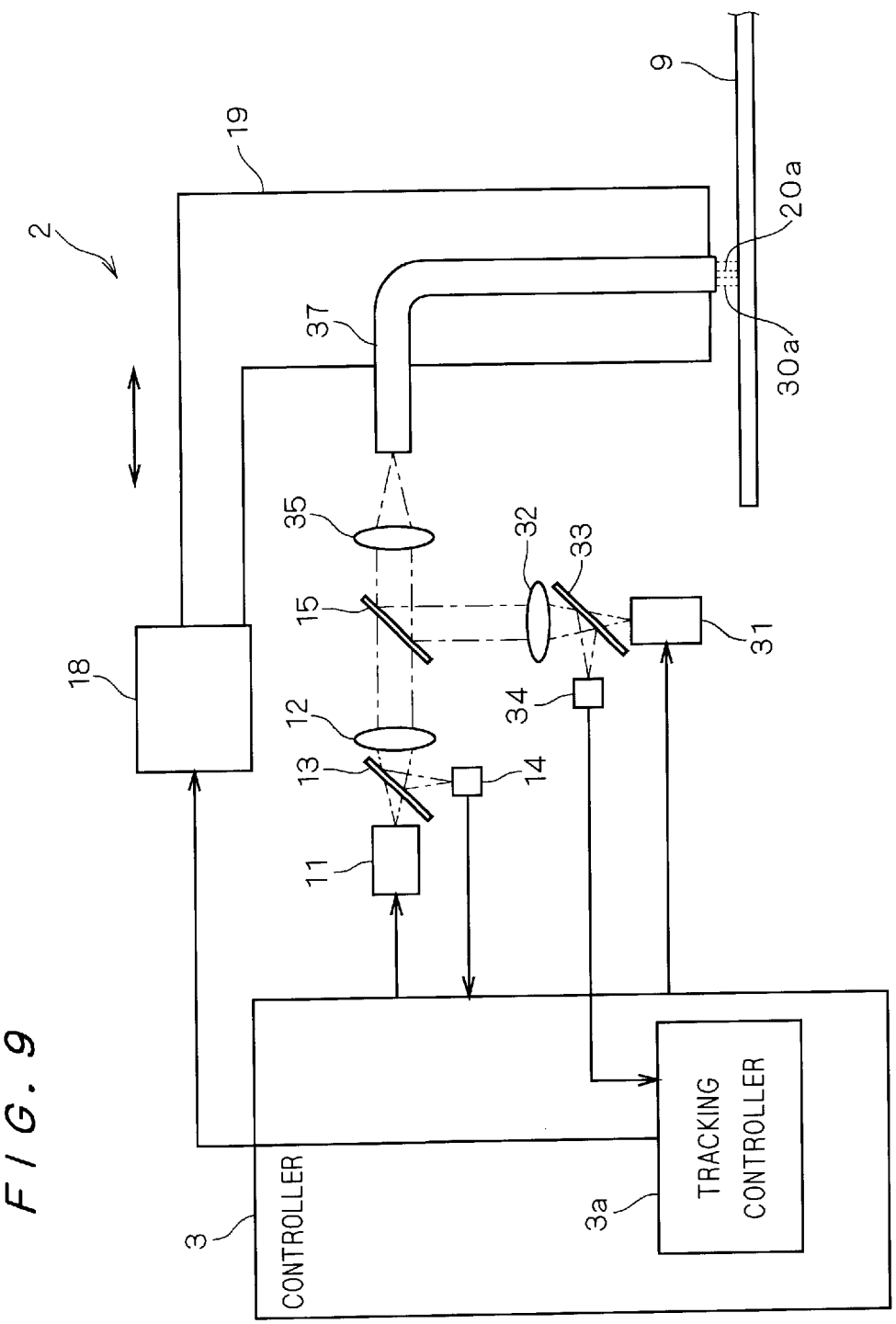
FIG. 9 is a conceptual view of constituents of the optical head according to a second preferred embodiment of the present invention.

FIG. 9 is a conceptual view showing the constituents of the optical head 2 according to the second preferred embodiment. The optical head 2 of the second preferred embodiment comprises: a recording or reproducing optical system including the laser light source 11, the beam splitter 13, the collimator lens 12 and the photodetector 14; a tracking optical system including the laser light source 31, the beam splitter 33, the collimator lens 32 and the signal detector 34; and an optical system common to these systems which includes a beam splitter 15, the condenser lens 35 and a fiber probe 37.

The beam splitter is provided to align the light from the laser light source 11 for recording or reproduction and the light from the laser light source 31 for tracking with each other into a single optical path. The light emitted from the laser light source 11 and the light emitted from the laser light source 31 are adapted to differ in wavelength from each other. The beam splitter 15 has the functions of transmitting light having a wavelength component emitted from the laser light source 11 and reflecting light having a wavelength component emitted from the laser light source 31. For example, when the light emitted from the laser light source 11 has a wavelength of 650 nm and the light emitted from the laser light source 31 has a wavelength of 442 nm, the beam splitter 15 is configured to transmit part of the light introduced into the beam splitter 15 which has the 650-nm wavelength and to reflect part of the light introduced into the beam splitter 15 which has the 442-nm wavelength.

The light from the laser light source 11 and the light from the laser light source 31 which are aligned by beam splitter 15 are introduced through the condenser lens 35 into a light incident end of the fiber probe 37. The fiber probe 37 has a light exiting end formed with two openings for transmitting light in accordance with the wavelength components to be described later. This allows the near-field light 20a having a minute diameter and the tracking illumination light 30a having a spot diameter greater than that of the near-field light 20a and coaxial therewith to be directed onto the recording medium 9.

Figure 10:
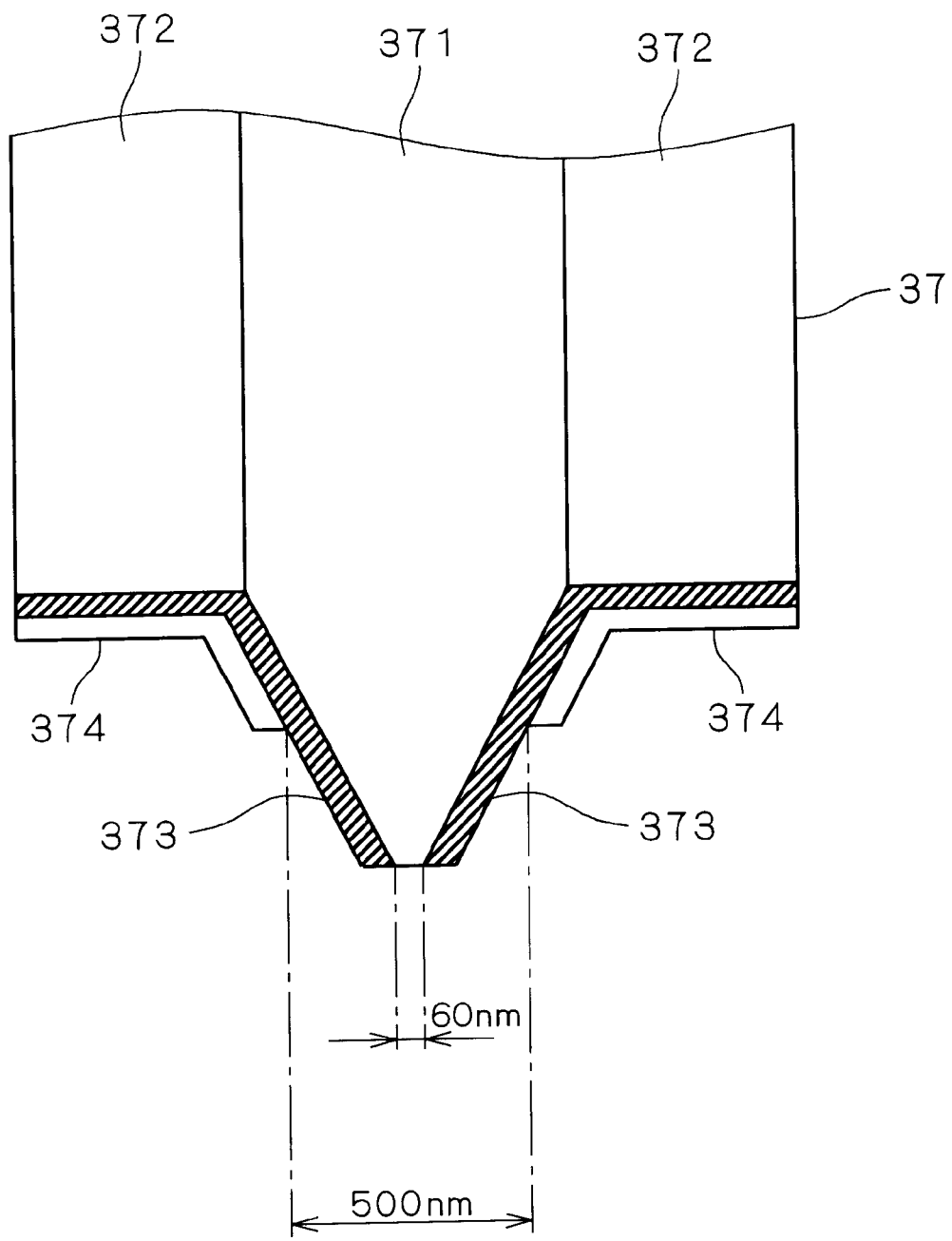
FIG. 10 is an enlarged view of a light exiting end of a fiber probe according to the second preferred embodiment.

FIG. 10 is an enlarged view of the light exiting end of the fiber probe 37. As shown in FIG. 10, the light exiting end of the fiber probe 37 is tapered in generally conical configuration by etching or the like, and includes a first light blocking film 373 formed on other than its apex, and a second light blocking film (complete light blocking film) 374 formed on part of the first light blocking film (semitransparent light blocking film) 373 at the foot thereof.

The first light blocking film 373 is made of a predetermined material which blocks out light having a recording or reproducing wavelength component (e.g., 650 nm) and transmits light having a tracking wavelength component (e.g., 442 nm). The second light blocking film 374 is a thick film of Cr or the like and completely blocks out both the light having the recording or reproducing wavelength component and the light having the tracking wavelength component.

The apex which is not covered with the light blocking films may have, for example, a diameter of about 60 nm to define a minute opening for generation of the near-field light. A technique for forming the minute opening includes, for example, forming the first light blocking film 373 over the entire light exiting end of the fiber probe 37 and then removing the first light blocking film 373 from the apex by etching or the like. This technique can relatively easily forms the minute opening. A core 371 at the apex is shaped into a generally planar configuration.

The second light blocking film 374 is provided to define an opening having a diameter of about 500 nm in concentric relation with the opening of the first light blocking film 373 at the tip of the fiber probe 37.

As a result, the near-field light 20a having a minute spot diameter of about 60 nm penetrates from the light exiting end of the fiber probe 37 into a near-field environment toward the recording medium 9, and the tracking illumination light 30a having a diameter of about 500 nm is directed from the light exiting end of the fiber probe 37 onto the recording medium 9. The near-field light 20a and the tracking illumination light 30a are disposed in coaxial relationship with each other. Thus, the near-field light 20a is located near the center of the tracking illumination light 30a. In the second preferred embodiment, a near-field optical means for generating and detecting the near-field light and an illumination means for directing the tracking illumination light onto the recording medium 9 are constructed integrally in the form of the single fiber probe 37, which directs the near-field light 20a and the tracking illumination light 30a in coaxial relationship with each other onto the recording medium 9.

Figure 11:
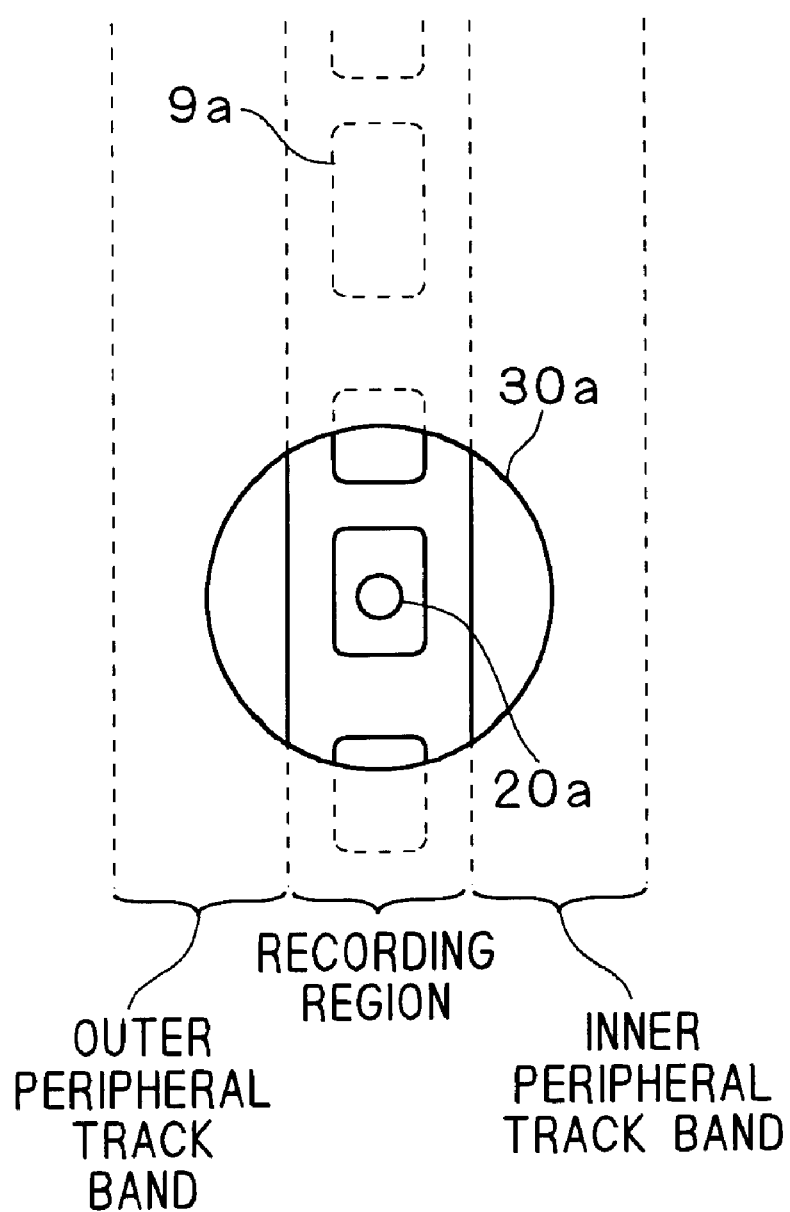
FIG. 11 shows the positional relationship between the near-field light and the tracking illumination light.

FIG. 11 shows the positional relationship between the near-field light 20a and the tracking illumination light 30a in the recording/reproducing apparatus 1 of the second preferred embodiment. As shown in FIG. 11, the near-field light 20a is located substantially at the center of the illumination area of the tracking illumination light 30a.

In general, the use of near-field light for the recording or reproduction of data on or from a recording medium requires high tracking accuracy since the recording medium 9 contains data recorded at a much higher density than the conventional one. To achieve the high tracking accuracy, it is necessary to use a probe which provides a definite positional relationship between the near-field light and the tracking illumination light.

With the arrangement of the near-field light 20a and the tracking illumination light 30a in coaxial relationship with each other as in the second preferred embodiment, the recording or reproducing position by means of the near-field light 20a is included in the central position of the illumination area of the tracking illumination light 30a, and the positional relationship between the near-field light 20a and the tracking illumination light 30a is definite. Additionally, the tracking control based on a judgement about the deviation of the tracking illumination light 30a from a track in accordance with the amount of reflected tracking illumination light 30a reliably places the near-field light 20a in the central position of the tracking illumination light 30a into the on-track state.

The reflections of the near-field light 20a and the tracking illumination light 30a from the recording medium 9 return to the fiber probe 37, propagate in the fiber probe 37 in the direction opposite from those when emitted, and are introduced into the condenser lens 35. Then, the reflection of the near-field light 20a passes through the beam splitter 15, is reflected from the beam splitter 13, and is introduced into the photodetector 14. The reflection of the tracking illumination light 30a is reflected from the beam splitter 15, reflected from the beam splitter 33 and introduced into the signal detector 34. The signal detector 34 of the second preferred embodiment, similar to that of the first preferred embodiment, includes a light detection device such as a photodiode, and measures the amount of the tracking illumination light 30a reflected from the illumination area. The amount of the reflected light measured by the signal detector 34 is applied as the tracking signal to the tracking controller 3a in the controller 3.

The tracking controller 3a provides the drive instruction to the optical head driver 18, based on the amount of reflected light provided from the signal detector 34.

As described above, the recording/reproducing apparatus 1 of the second preferred embodiment is configured to direct the near-field light and the tracking illumination light in coaxial relationship with each other onto the recording medium to detect a tracking error centering about the recording or reproducing position of the near-field light. Therefore, high-accuracy tracking control can be achieved.

Further, in the second preferred embodiment, the near-field optical means for generating the near-field light and the illumination means for directing the tracking illumination light onto the recording medium are implemented integrally by the fiber probe 37. This reduces the number of optical parts, as compared with an apparatus in which the near-field optical means and the illumination means are provided separately. Therefore, the second preferred embodiment provides further reductions in size, thickness and weight of the recording/reproducing apparatus 1.

3. Third Preferred Embodiment

A third preferred embodiment according to the present invention will be described. The third preferred embodiment features a recording medium differing in configuration from the above-mentioned recording medium. The recording medium 9 of third preferred embodiment is similar to that of the first and second preferred embodiments in comprising the outer peripheral track band 91 formed on the outer periphery of and along each recording pit row 92, and the inner peripheral track band 93 formed on the inner periphery of and along each recording pit row 92 and having an optical responsivity different from that of the outer peripheral track band 91. However, the outer peripheral track band 91 and the inner peripheral track band 93 may have the same reflectivity in the third preferred embodiment.

Figure 12:
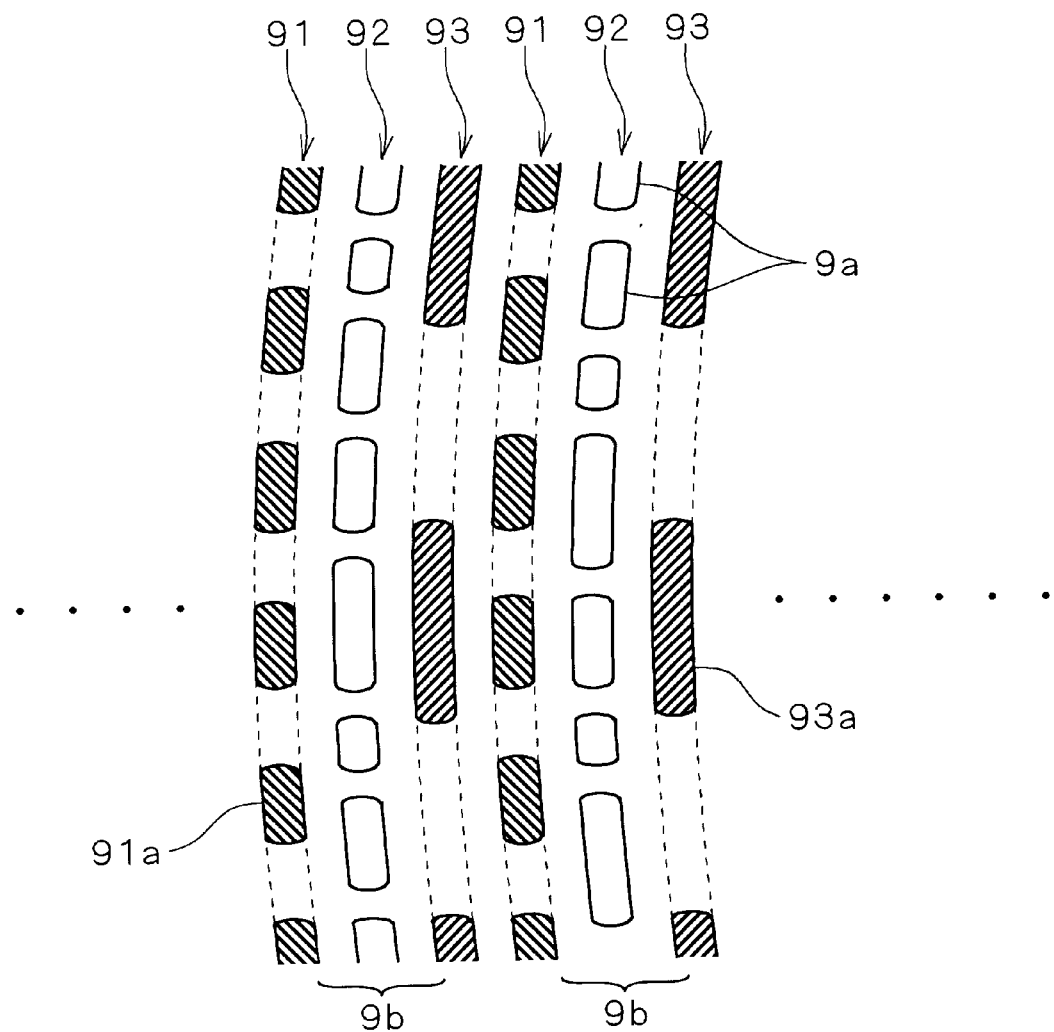
FIG. 12 is a conceptual view showing recording bands of a recording medium different from those of FIG. 5.

FIG. 12 is a conceptual view of the recording bands of the recording medium 9 according to the third preferred embodiment. As shown in FIG. 12, track pits 91*a* are arranged at a first spacing in the outer peripheral track band 91, and track pits 93*a* are arranged at a second spacing in the inner peripheral track band 93. On the other hand, the recording pits 9*a* corresponding to recorded data are intermittently formed in the recording pit row 92, as above described. The recording pit row 92 is formed substantially in the middle of the recording region 9*b* between the outer peripheral track band 91 and the inner peripheral track band 93.

The spacing between the outer peripheral track pits 91*a* and the spacing between the inner peripheral track pits 93*a* are adapted to differ from each other. For example, the outer peripheral track pits 91*a* are arranged at a 200 μm spacing and the inner peripheral track pits 93*a* are arranged at a 500 μm spacing. Although the outer peripheral track pits 91*a* and the inner peripheral track pits 93*a* may be the same in reflectivity for the tracking illumination light, a difference is required in reflectivity between the track pits and other parts in a track band.

The detection of the tracking signal using the recording/reproducing apparatus 1 of the first or second preferred embodiment allows the detection of a light amount variation with a first cycle in accordance with the outer peripheral track pits 91*a* and a light amount variation with a second cycle in accordance with the inner peripheral track pits 93*a*.

The tracking controller 3*a* makes a comparison between the light amount variation with the first cycle and the light amount variation with the second cycle, and can judge that a deviation from the on-track state occurs if one of the light amount variations is relatively great. For example, if the light amount variation with a cycle of 200 μm increases, the tracking controller 3*a* judges that the optical head 2 is deviated toward the outer periphery. If the light amount variation with a cycle of 500 μm increases, the tracking controller 3*a* judges that the optical head 2 is deviated toward the inner periphery.

More specifically, the tracking controller 3*a* calculates a difference between the light amount variation with the first cycle and the light amount variation with the second cycle, and judges whether or not the difference falls within a range between specified upper and lower limits. If the difference is greater than the upper limit, the tracking controller 3*a* judges that the optical head 2 is deviated toward one of the outer and inner peripheries and provides the drive instruction to the optical head driver 18 so as to move the optical head 2 toward the other periphery. If the difference is less than the lower limit, the tracking controller 3*a* judges that the optical head 2 is deviated toward the other periphery and provides the drive instruction to the optical head driver 18 so as to move the optical head 2 toward the one periphery.

The above tracking control is effectively operative when the recording medium 9 is controlled to rotate with constant linear velocity. On the other hand, when the recording medium 9 is controlled to rotate with constant angular velocity, it is necessary to modify the configuration of the track pits to be formed in the recording medium 9.

When the recording medium 9 is controlled to rotate with constant angular velocity, the arrangement of the track pits at a predetermined spacing as above described results in a difference in cycle of the light amount variation between a tracking signal near the center of the recording medium 9 and a tracking signal near the outer edge thereof. In this case, the cycle of the light amount variation near the outer edge is shorter than that near the center. This causes a difficulty in detecting the light amount variation for each predetermined cycle.

Therefore, when the recording medium 9 is controlled to rotate with constant angular velocity, it is necessary to arrange the track pits at a predetermined angle on the center of rotation of the recording medium 9. Thus, changing the track pit spacing in accordance with radial positions so that the track pit spacing increases toward the outer edge provides a coincidence in light amount variation cycle between the tracking signal detected near the center of the recording medium 9 and the tracking signal detected near the outer edge thereof.

According to the third preferred embodiment, as described hereinabove, the two different track bands on the outer and inner peripheries of the recording pit row include the outer peripheral track band 91 in which the track pits 91*a* are arranged at the first spacing and the inner peripheral track band 93 in which the track pits 93*a* are arranged at the second spacing. Thus, the amount of the reflected tracking illumination light varies in cycles associated with the first and second spacings. The tracking control, if performed in accordance with the light amount variation, achieves high accuracy by the use of only the single tracking probe.

4. Fourth Preferred Embodiment

A fourth preferred embodiment according to the present invention will be described. The fourth preferred embodiment also features a recording medium differing in configuration from the above-mentioned recording medium. The recording medium 9 of fourth preferred embodiment is similar to that described above in comprising the outer peripheral track band 91 formed on the outer periphery of and along each recording pit row 92, and the inner peripheral track band 93 formed on the inner periphery of and along each recording pit row 92 and having an optical responsivity different from that of the outer peripheral track band 91. However, the fourth preferred embodiment differs from the above-mentioned preferred embodiments in the configuration of the outer peripheral track band 91 and the inner peripheral track band 93.

In the fourth preferred embodiment, metal ions are implanted into the outer peripheral track band 91 and the inner peripheral track band 93 of the recording medium 9 shown in FIG. 5 to form track bands on the outer and inner peripheries of each recording pit row 92. For example, when metal ions are directly implanted by ion irradiation at an accelerating voltage of 50 kV, the track bands having a width of about 600 nm and a position accuracy of about 300 nm are formed.

In the fourth preferred embodiment, Ni ions are implanted into the outer peripheral track band 91, and Cr ions are implanted into the inner peripheral track band 93. As a result, the outer peripheral track band 91 implanted with the Ni ions acts to absorb a blue wavelength range, and the inner peripheral track band 93 implanted with the Cr ions acts to absorb a red wavelength range.

A light source for emitting light containing red and blue wavelength components, such as a xenon lamp, is used as the light source of the tracking illumination light of the optical head 2. The light containing red and blue wavelength components is directed as the tracking illumination light 30a onto the recording band as shown in FIG. 7A, and the transmitted light is separated into red light and blue light and detected on the backside of the recording medium 9.

With such arrangement, the property of absorbing the red light and the property of absorbing the blue light are approximately equal in the on-track state. However, in the case of the deviation toward the outer periphery, the transmitted light contains the red light component in greater amount since more blue light is absorbed. In the case of the deviation toward the inner periphery, the transmitted light contains the blue light component in greater amount since more red light is absorbed.

Therefore, the signal detection means may detect whether the transmitted light contains the red light component or the blue light component in greater amount, whereby the tracking controller can perform the correct tracking control based on the result of the detection. Similar effects are, of course, produced when Cr ions are implanted into the outer peripheral track band 91 and Ni ions are implanted into the inner peripheral track band 93.

The construction of an optical system for introducing the light from the light source, such as a xenon lamp, as the tracking illumination light onto the recording medium 9 may employ the construction shown in FIG. 2. Therefore, only the single probe for tracking is required also in the fourth preferred embodiment.

The fourth preferred embodiment, however, is required to detect the transmitted tracking illumination light on the backside of the recording medium 9 and, accordingly, involves the need to provide an additional structure for the detection.

The implanted ions include, but not limited to, the Cr ions and Ni ions in the fourth preferred embodiment. Other metal ions may be implanted so far as the outer peripheral track band 91 and the inner peripheral track band 93 exhibit the properties of absorbing different wavelength ranges, respectively.

5. Fifth Preferred Embodiment

Figure 13:
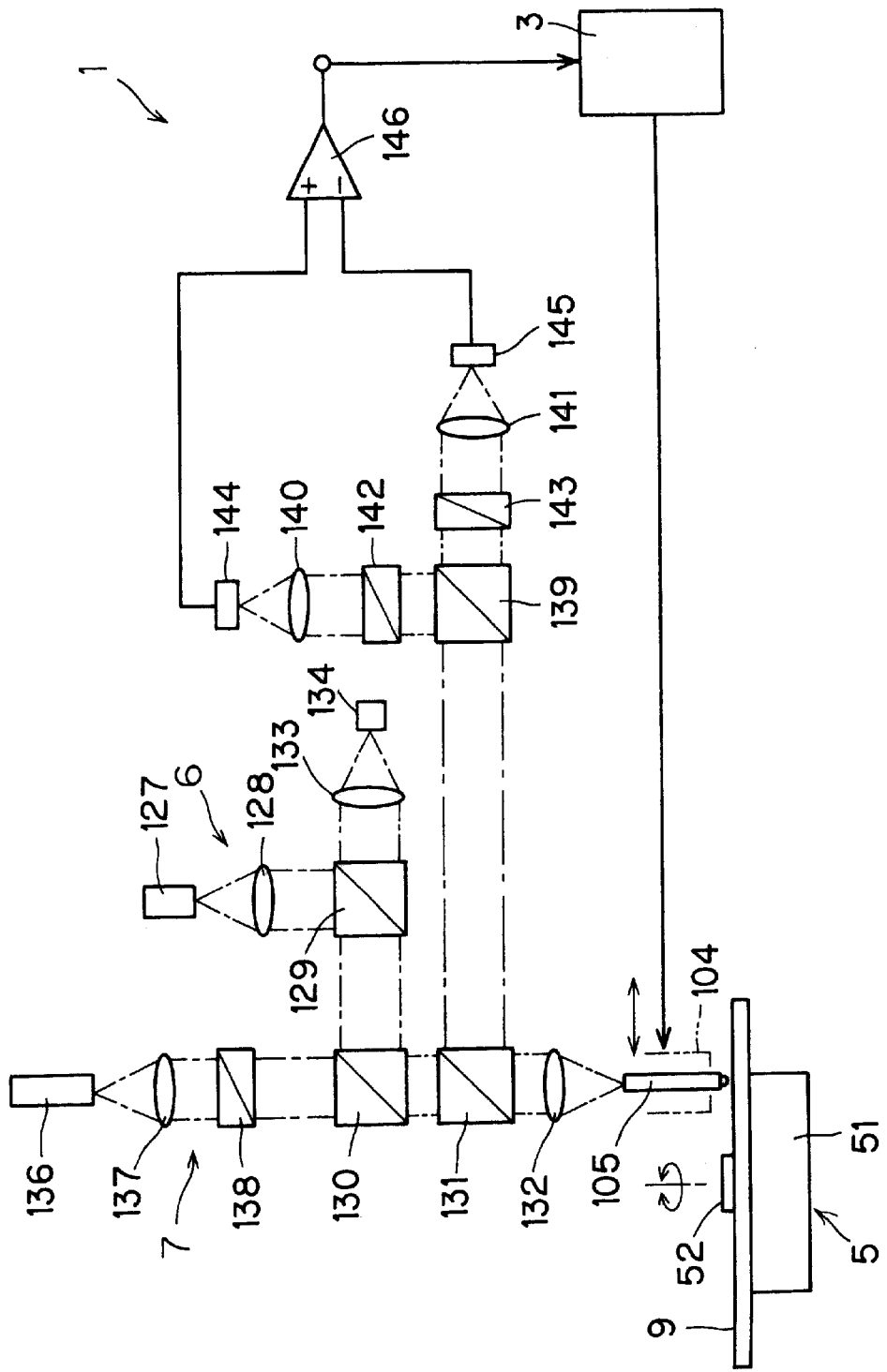
FIG. 13 schematically illustrates the construction of the recording/reproducing apparatus according to a fifth preferred embodiment of the present invention.

A fifth preferred embodiment according to the present invention will be described with reference to the drawings. FIG. 13 schematically illustrates the recording/reproducing apparatus 1 according to the fifth preferred embodiment. The recording/reproducing apparatus 1 comprises: the rotating mechanism 5 for rotating the recording medium 9 such as an optical disc in a predetermined direction while holding the recording medium 9 thereon; an optical head 104 for recording or reproducing (reading) a signal on or from the recording surface of the recording medium 9; a recording/reproducing optical path 6 serving as a recording/reproducing light illumination means for supplying laser light for recording or reproduction to a fiber probe 105 serving as an optical guide element provided in the optical head 104; a tracking optical path 7 serving as a tracking light illumination means for supplying laser light serving as the tracking illumination light to the fiber probe 105 of the optical head 104; and the controller 3 serving as a control means for controlling the driving of the constituents of the apparatus 1, such as the rotating mechanism 5, the optical head 104, the recording/reproducing optical path 6 and the tracking optical path 7.

The rotating mechanism 5 includes the rotation driver 51, and the rotating member 52 driven by the rotation driver 51 to rotate in a predetermined direction. The rotating member 52 is constructed to removably hold the recording medium 9 in a predetermined position. Based on the drive control signal from the controller 3, the rotation driver 51 rotates the rotating member 52 which in turn rotates integrally with the recording medium 9 mounted thereto.

Figure 14:
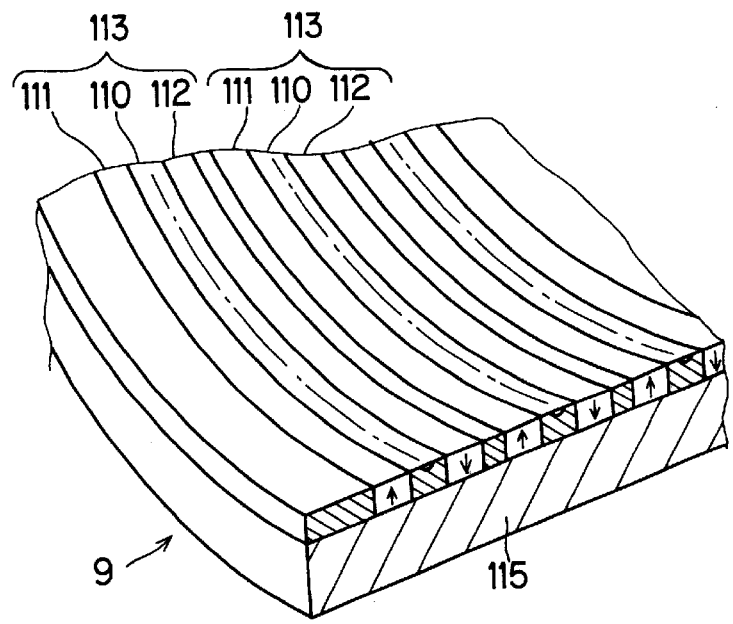
FIG. 14 is a perspective view, partly in cross section, of a recording medium shown in FIG. 13.
Figure 15:
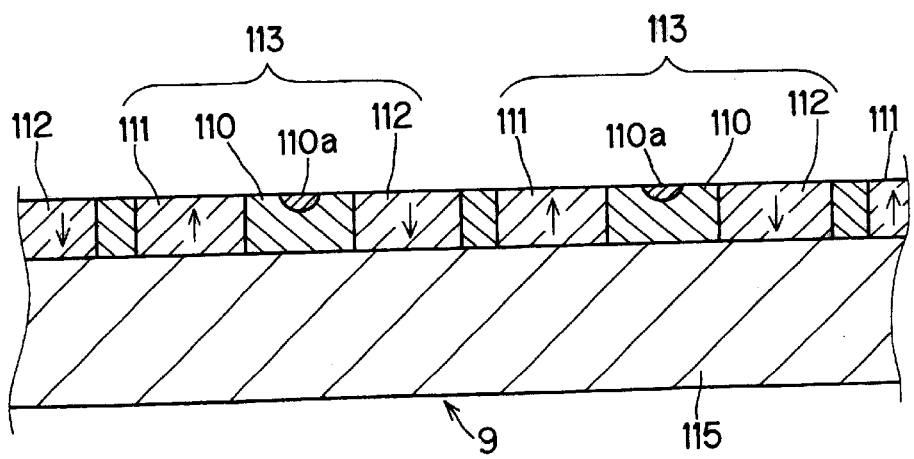
FIG. 15 is a cross-sectional view of the recording medium of FIG. 14.

The recording medium 9 is disc-shaped, and comprises concentric recording pit rows 110 on its upper recording surface, as shown in FIGS. 14 and 15. An outer peripheral track band (outer pattern row) 111 and an inner peripheral track band (inner pattern row) 112 which differ in optical characteristic from each other are provided on the outer and inner peripheries of each recording pit row 110. The outer peripheral track band 111, the recording pit row 110 and the inner peripheral track band 112 constitute one annular recording band 113. The recording surface has a multiplicity of such recording bands 113 radially spaced a predetermined spacing apart from each other.

Individual recording pits 110a are formed in each recording pit row 110 to record data, and the data recorded on each recording pit row 110 is read for reproduction.

In the recording medium 9 of the fifth preferred embodiment, the directions of magnetization of magnetized patterns of the outer peripheral track band 111 and the inner peripheral track band 112, respectively, are perpendicular to the recording surface and opposite from each other as indicated by the arrows of FIGS. 14 and 15 so that the outer peripheral track band 111 and the inner peripheral track band 112 exhibit different optical characteristics.

Figure 16:
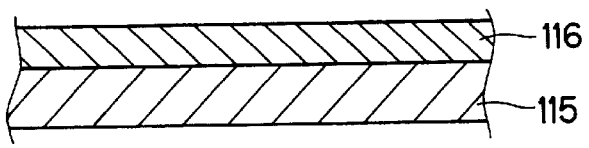
FIGS. 16 through 20 illustrate the manufacturing steps of the recording medium.

The recording medium 9 of the fifth preferred embodiment is manufactured, for example, by a method to be described below. With reference to FIG. 16, a chromium layer 116 having a predetermined thickness is evaporated on one surface of a glass substrate 115.

Figure 17:
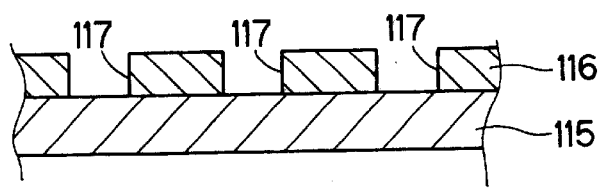
Figure 18:
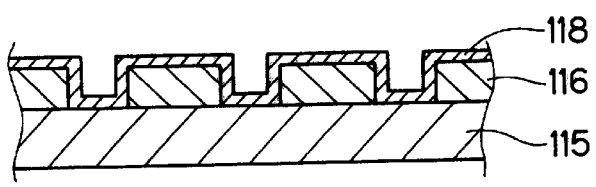

Next, the chromium layer 116 is melted and removed concentrically in radially, predetermined spaced relation to form a multiplicity of grooves 117 having a predetermined width on the glass substrate 115, as shown in FIG. 17. Then, as illustrated in FIG. 18, a tellurium-based magnetic material having a predetermined thickness, e.g. 160 nm, is deposited on the surface of a resultant structure by a sputtering process, to form a magnetic layer 118. Thus, the magnetic layer 118 is formed along the concentric irregularities on the surface of the glass substrate 115.

Figure 19:
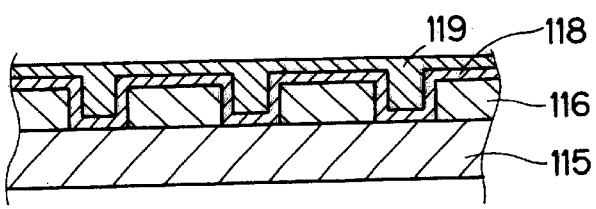

With reference to FIG. 19, a photochromic material having a predetermined thickness, e.g. 200 nm (40 nm on the magnetic layer 118 overlying the chromium layer 116), is deposited on the magnetic layer 118 by a spin coating process, to form a recording layer 119. Thus, the recording layer 119 having a planar top surface is formed.

Figure 20:
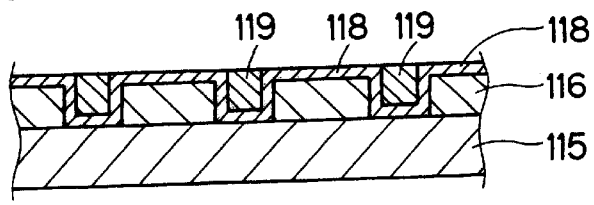

Next, as illustrated in FIG. 20, a predetermined thickness, e.g. 80 nm, of the resultant structure is etched away from the top surface thereof, to expose the magnetic layer 118 and the recording layer 119 in an alternating pattern at the top surface. Thus, in a layer region of a thickness of 80 nm from the top surface, magnetic recording regions in the form of stripes of the magnetic layer 118 and optical recording regions in the form of stripes of the recording layer 119 are arranged concentrically and radially in an alternating pattern. The optical recording regions will serve as the recording pit rows 110, and the magnetic recording regions on the opposite sides of each optical recording region will serve as the outer peripheral track band 111 and the inner peripheral track band 112 for recording tracking information.

Magnetized patterns serving as the tracking information are recorded in the magnetic recording regions. For example, while laser light is focused to raise the temperature of the magnetic recording regions, a vertical magnetic field is applied to the surface of the recording medium 9 by using a coil, a magnet and the like to orient the directions of magnetization of the track bands to proper directions, respectively. At this time, the magnetized patterns in the opposite directions are recorded respectively in the magnetic recording regions located on the outer and inner peripheries of the optical recording region corresponding to each of the recording pit row 110. For example, the magnetic recording region located on the outer periphery is magnetized so that the N magnetic pole is at the surface, and the magnetic recording region located on the inner periphery is magnetized so that the S magnetic pole is at the surface. This provides the recording medium 9 in which the magnetized patterns in the predetermined directions serving as the tracking information are written in the outer and inner peripheral track bands 111 and 112, respectively, as shown in FIGS. 14 and 15. A servo writer for use in a hard disc, for example, may be utilized to generate the magnetized patterns.

Figure 21:
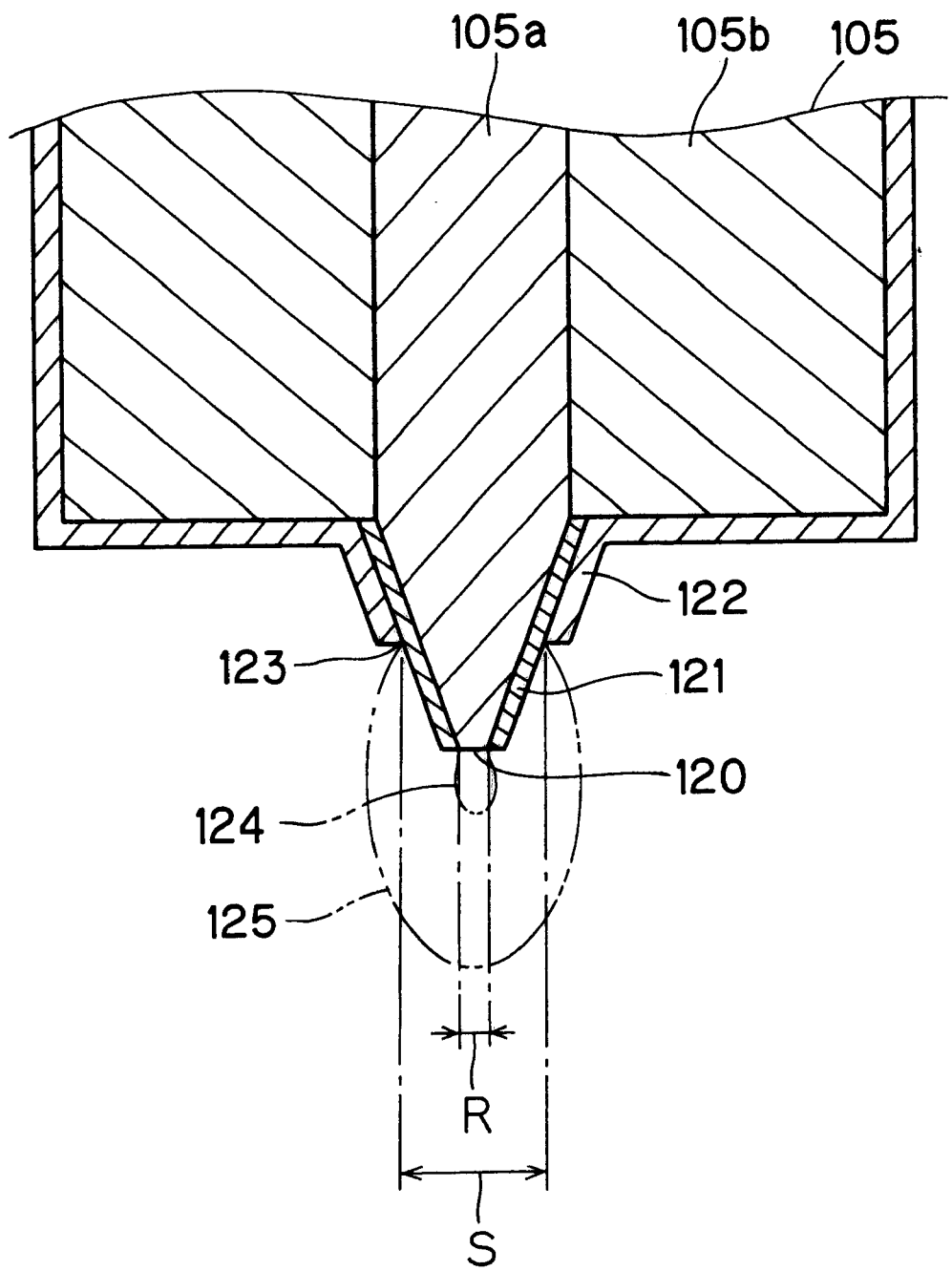
FIG. 21 is a cross-sectional view of the tip of the fiber probe.

With reference to FIG. 21, the fiber probe 105 comprises a core 105a disposed centrally thereof, and a cladding 105b surrounding the core 105a. A light exiting tip of the core 105a is tapered in generally conical configuration by etching or the like. A semitransparent light blocking film 121 (semitransparent light blocking portion) serving as an inner light blocking portion covers the light exiting tip and has a minute opening 120 at its apex. A complete light blocking film 122 (complete light blocking portion) serving as an outer light blocking portion covers an area extending from the foot of the semitransparent light blocking film 121 to the end and side surfaces of the cladding 105b.

The semitransparent light blocking film 121 is a multi-layer film made of a predetermined material, and is adapted to block out light having a recording or reproducing wavelength (e.g., 410 nm) and transmit light having a tracking wavelength (e.g., 630 nm). The complete light blocking film 122 is a thick film (e.g. 3000 Å in thickness) of Cr or the like and is adapted to completely block out both the light having the recording or reproducing wavelength and the light having the tracking wavelength.

The circular minute opening 120 at the apex has an opening width, or an opening diameter R, which is shorter than both the wavelength of the recording or reproducing light and the wavelength of the tracking light and is, for example, about 50 nm. This provides the minute opening for the generation of near-field light. A method of forming the minute opening 120 includes, for example, forming the semitransparent light blocking film 121 over the entire conical tip of the fiber probe 105 and then removing the semitransparent light blocking film 121 from the apex by etching or the like. This method can relatively easily forms the minute opening 120. The core 105a at the apex is shaped into a generally planar configuration.

The complete light blocking film 122 is provided to define an opening 123 having an opening diameter S of about 200 nm in concentric relation with the minute opening 120 at the conical tip of the fiber probe 105.

As a result, near-field light 124 having a minute spot diameter of about 50 nm penetrates from the tip of the fiber probe 105 into a near-field environment toward the recording medium 9, and tracking illumination light 125 having a greater spot diameter of about 200 nm is directed from the tip of the fiber probe 105 onto the recording medium 9, as shown in phantom in FIG. 21. Thus, the near-field light 124 serving as the recording or reproducing light and the tracking illumination light 125 having a greater spot than that of the near-field light 124 are directed in coaxial relationship onto the recording medium.

Figure 22:
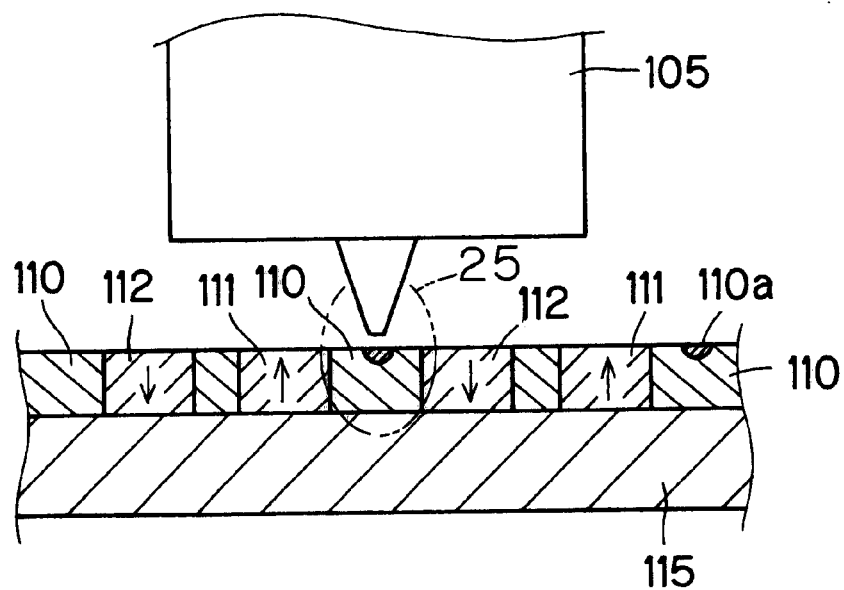
FIG. 22 illustrates a tracking operation.

In terms of tracking accuracy, the spot diameter of the tracking illumination light 125 or the spacing between the outer peripheral track band 111 and the inner peripheral track band 112 is preferably controlled so that, when the tip of the fiber probe 105 is positioned to face the middle of a recording pit row 110, the tracking illumination light 125 is sized to cover parts of the outer and inner peripheral track bands 111 and 112 on the opposite sides of the recording pit row 110, as shown in FIG. 22, as in the fifth preferred embodiment.

Referring again to FIG. 13, the recording/reproducing optical path 6 comprises a recording/reproducing light source 127 including a laser diode and the like for emitting laser light (e.g., having a wavelength of 410 nm) serving as the recording or reproducing light; a first collimator lens 128; first, second and third beam splitters 129, 130 and 131; first and second condenser lenses 132 and 133; and a first photodetector 134 including a photodiode and the like.

With continued reference to FIG. 13, the tracking optical path 7 comprises a tracking light source 136 including a laser diode and the like for emitting laser light (e.g., having a wavelength of 630 nm) serving as the tracking illumination light; a second collimator lens 137; a polarizer 138; the second and third beam splitters 130 and 131; a fourth beam splitter 139; the first condenser lens 132; third and fourth condenser lenses 140 and 141; first and second analyzers 142 and 143; and second and third photodetectors 144 and 145 including a photodiode and the like.

The second beam splitter 130, the third beam splitter 131 and the first condenser lens 132 are used both in the recording/reproducing optical path 6 and in the tracking optical path 7. The second beam splitter 130 is a wavelength-selective beam splitter which fully transmits light having the wavelength component of the tracking laser light, and the third beam splitter 131 is a wavelength-selective beam splitter which fully transmits light having the wavelength component of the recording/reproducing laser light.

Based on the drive signal from the controller 3, when the laser light emitted from the recording/reproducing light source 127 is the recording light, the laser light is collimated by the first collimator lens 128, and the collimated laser light is guided through the beam splitters 129, 130 and 131 sequentially into the condenser lens 132. The light focused by the condenser lens 132 is then guided to a first end of the fiber probe 105, and directed as the near-field light 124 from the minute opening 120 at the tip on a second end of the fiber probe 105 onto a recording pit row 110 of the recording medium 9 to record desired information thereon.

Based on the drive signal from the controller 3, when the laser light emitted from the recording/reproducing light source 127 is the reproducing light, the laser light is similarly collimated by the first collimator lens 128, and the collimated laser light is guided through the beam splitters 129, 130 and 131 sequentially into the condenser lens 132. The light focused by the condenser lens 132 is then directed as the near-field light 124 from the minute opening 120 at the tip of the fiber probe 105 onto a recording pit row 110 of the recording medium 9. The light reflected from the recording pit row 110 is guided through the minute opening 120 into the fiber probe 105. The reflected light is then guided through the first condenser lens 132, the third beam splitter 131, the second beam splitter 130 and the first beam splitter 129 sequentially into the second condenser lens 133. The reflected light focused by the second condenser lens 133 is detected by the first photodetector 134. The controller 3 reproduces the information recorded on a recording pit 110a of the recording pit row 110 based on a detection signal from the first photodetector 134.

Based on the drive signal from the controller 3, the laser light emitted from the tracking light source 136, on the other hand, is collimated by the second collimator lens 137, and the collimated laser light is linearly polarized by the polarizer 138. The linearly polarized light is guided through the second beam splitter 130 and the third beam splitter 131 sequentially into the first condenser lens 132. The light focused by the first condenser lens 132 is then directed from the opening 123 at the tip of the fiber probe 105 through the semitransparent light blocking film 121 onto the recording medium 9.

The light reflected from the recording medium 9 is guided through the opening 123 into the fiber probe 105. The reflected light then passes through the first condenser lens 132, and is guided by the third beam splitter 131 into the fourth beam splitter 139.

The fourth beam splitter 139 is a polarization beam splitter for separating the reflected light guided thereto into polarized light components perpendicular to each other which in turn are guided into the first and second analyzers 142 and 143, respectively. These polarized light components are focused by the third and fourth condenser lenses 140 and 141 on the second and third photodetectors 144 and 145 and detected by the second and third photodetectors 144 and 145, respectively.

The detection signals detected by the respective photodetectors 144 and 145 are inputted to a comparator circuit 146. The controller 3 judges the direction of rotation (tracking information) of the plane of polarization of the reflected light in accordance with the magnitudes of the detection signals, and then judges whether the optical head 104 is deviated from the middle of the recording pit row 110 toward the outer peripheral track band 111 or toward the inner peripheral track band 112, in accordance with the direction of rotation of the plane of polarization. Then, the controller 3 controls the optical head 104 to drive the optical head 104 in the radial direction of the recording medium 9 to perform tracking control so that the optical head 104 follows the recording pit row 110.

A phenomenon such that linearly polarized light incident on a magnetized region rotates the plane of polarization of reflected light in accordance with the direction of a magnetized pattern is known as the Kerr effect. Because of the opposite directions of the magnetization of the magnetized patterns of the outer and inner peripheral track bands 111 and 112, the outer and inner peripheral track bands 111 and 112 differ in the direction of rotation of the plane of polarization of the light reflected therefrom. Therefore, whether the optical head 104 is deviated toward the outer or inner periphery is judged from the direction of rotation of the plane of polarization of the reflected light.

For example, when the tip of the fiber probe 105, or the center of the optical head 104, is positioned to face the middle of the recording pit row 110 as shown in FIG. 22, the laser light for tracking impinges upon equal slight areas of the respective outer and inner peripheral track bands 111 and 112 on the opposite sides of the recording pit row 110.

Figure 23:
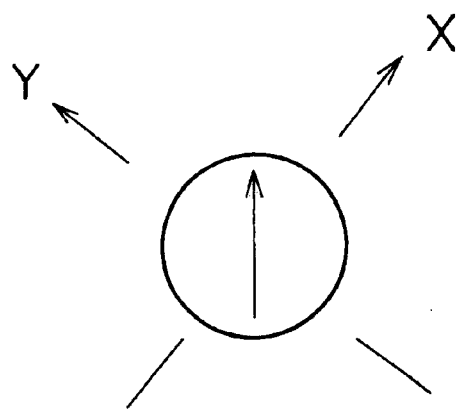
FIG. 23 illustrates the plane of polarization of reflected light in the tracking operation of FIG. 22.
Figure 27:
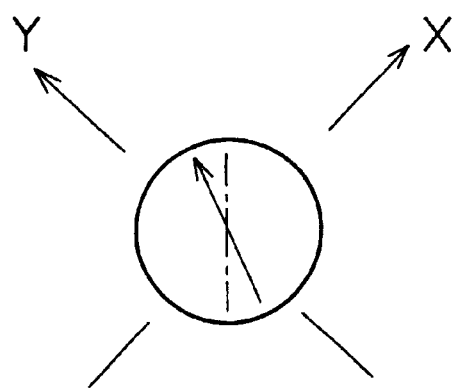
FIG. 27 illustrates the plane of polarization of reflected light in the tracking operation of FIG. 26.
Figure 28:
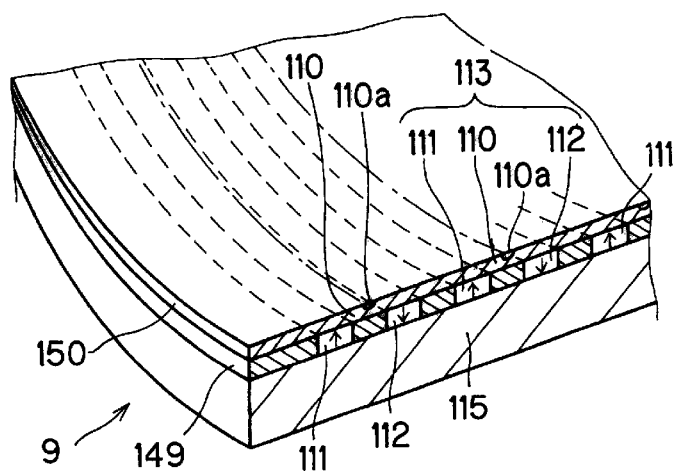
FIG. 28 is a perspective view, partly in cross section, of the recording medium according to a sixth preferred embodiment of the present invention.
Figure 29:
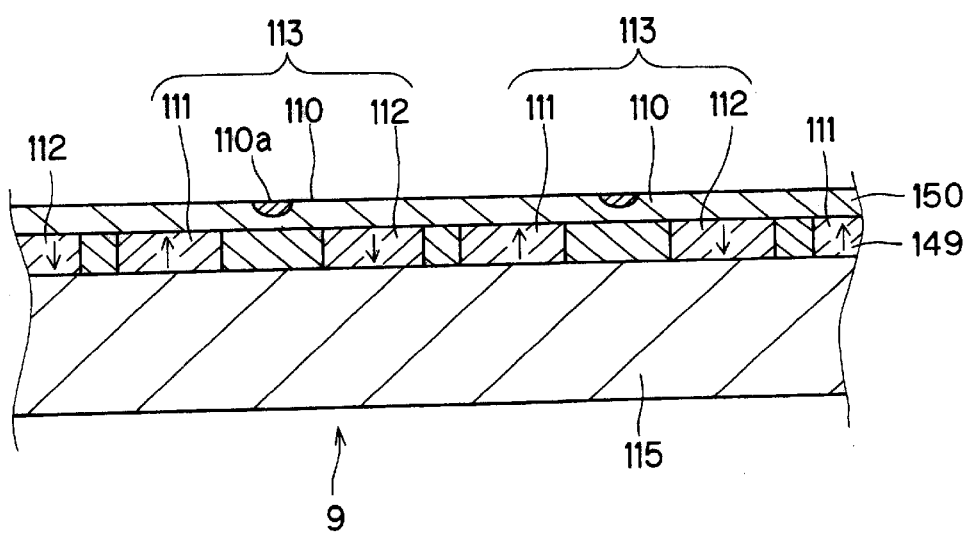
FIG. 29 is a cross-sectional view of the recording medium of FIG. 28.

In this case, the rotation of the plane of polarization of the reflected light is little detected as shown in FIG. 23. Specifically, the rotation is detected when the light impinges upon a large area of the magnetized pattern regions. However, when the light impinges upon substantially no area of the magnetized pattern regions or when a slight area is detected but the rotation in the opposite directions are detected and is differentially amplified, the controller 3 judges that no rotation is detected or the tip of the fiber probe 105 is positioned to face the middle of the recording pit row 110. In FIGS. 23, 25 and 27, X and Y designate the directions of the polarized light components resulting from the separation by the fourth beam splitter 139 serving as the polarization beam splitter. The polarized light components oriented in the X and Y directions are displaced 45 degrees from the direction of polarization of the illumination light in positive and negative directions, respectively.

When the center of the optical head 104 is deviated toward the outer periphery of the recording pit row 110 as shown in FIG. 24, the laser light for tracking impinges upon a greater area of the outer peripheral track band 111, and the magnetized pattern of the outer peripheral track band 111 rotates the plane of polarization of the reflected light, for example, in a clockwise direction (toward the X direction) as shown in FIG. 25. The angle of the clockwise rotation of the plane of polarization is proportional to the amount of deviation.

Figure 26:
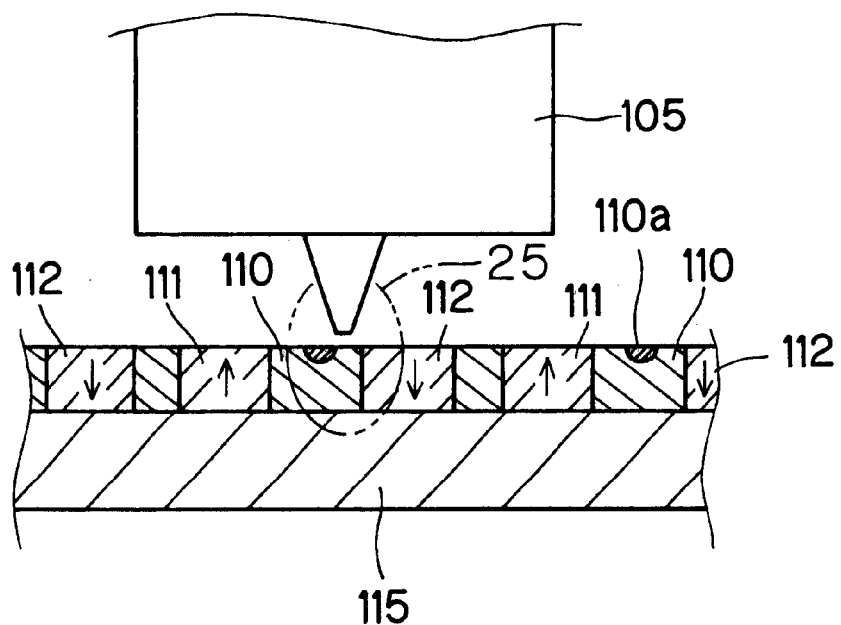
FIG. 26 illustrates a tracking operation.

On the other hand, when the center of the optical head 104 is deviated toward the inner periphery of the recording pit row 110 as shown in FIG. 26, the laser light for tracking impinges upon a greater area of the inner peripheral track band 112, and the magnetized pattern of the inner peripheral track band 112 which is in the opposite direction from the magnetized pattern of the outer peripheral track band 111 rotates the plane of polarization of the reflected light, for example, in a counterclockwise direction (toward the Y direction) as shown in FIG. 27. The angle of the counterclockwise rotation of the plane of polarization is also proportional to the amount of deviation.

Thus, the direction of rotation of the plane of polarization of the reflected light is determined by the magnitudes of the detection signals from the respective photodetectors 144 and 145. Whether the optical head 104 is deviated toward the outer or inner periphery is judged in accordance with the direction of rotation of the plane of polarization, and the magnitude of the deviation is easily judged by determining the magnitude of the angle of rotation of the plane of polarization. This achieves efficient tracking control. Thus, the photodetectors 144, 145, the comparator circuit 146 and the like constitute a tracking information detection means for detecting the tracking information.

The fifth preferred embodiment as described above illustrates the technique which uses the minute spot of the near-field light 124 to record the recording pit 110a on the recording surface of the recording medium 9 or to reproduce (read) the recording pit 110a recorded on the recording surface. This technique provides the recording pit 110a having a size not greater than the wavelength to achieve high-density data recording on the recording medium 9 and the reproduction of the data recorded at the high density.

The fifth preferred embodiment illustrates the method and structure for directing the laser light from the recording/reproducing light source 127 and the laser light from the tracking light source 136 in coaxial relationship onto the recording medium 9. Thus, the apparatus 1 of the fifth preferred embodiment requires only the single fiber probe 105 and the single laser light from the tracking light source 136. This eliminates the conventional need to adjust the spacing between a plurality of fiber probes, to facilitate the manufacture and reduce the size of the optical head 104.

A method of directing the laser light from the recording/reproducing light source 127 and the laser light from the tracking light source 136 from different positions onto the recording medium 9 encounters difficulties in maintaining the positional relationship therebetween with accuracy on the order of 10nm during the manufacture of the apparatus. However, the method and structure for directing the laser light from the recording/reproducing light source 127 and the laser light from the tracking light source 136 in coaxial relationship onto the recording medium 9 as in the fifth preferred embodiment readily provides the stable positional relationship therebetween for light emission to achieve accurate tracking control.

Further, the illumination area of the tracking illumination light 125 includes slight areas of the outer and inner peripheral track bands 111 and 112 on the opposite sides of the recording pit row 110 as shown in FIG. 22. Therefore, when the optical head 104 starts deviating from the middle of the recording pit row 110, the plane of polarization of the reflected light rotates early. Thus, high-accuracy tracking control is achieved. Additionally, the magnitude of the deviation is easily judged in accordance with the magnitude of the angle of clockwise or counterclockwise rotation of the plane of polarization. This is advantageous in efficient tracking control.

Furthermore, the second beam splitter 130 is the wavelength-selective beam splitter which fully transmits the light having the wavelength component of the tracking laser light, and the third beam splitter 131 is the wavelength-selective beam splitter which fully transmits the light having the wavelength component of the recording or reproducing laser light. Thus, only the reflected light for recording or reproduction is guided into the first photodetector 134, and only the reflected light for tracking is guided into the second and third photodetectors 144 and 145. This ensures a high signal-to-noise ratio to provide good signal detection reliability.

Moreover, the fifth preferred embodiment illustrates the technique of detecting the tracking information by using the magnetized patterns different in direction of magnetization. This technique can render the recording surface of the recording medium 9 planar, and is particularly suitable for the recording and reproduction utilizing the near-field light 124 as in the fifth preferred embodiment. Further, when manufacturing the recording medium 9, there is no need to produce irregularities on the order of tens of nanometers. The width of the magnetized patterns need not be tens of nanometers, but it is only required to ensure the correct position of the magnetized patterns relative to the recording pit row 110. This facilitate the manufacture of the recording medium 9.

6. Sixth Preferred Embodiment

FIGS. 28 through 32 illustrate the recording medium 9 according to a sixth preferred embodiment of the present invention. Components similar to those of the fifth preferred embodiment are designated by the same reference numerals and characters, and the description thereon will be omitted in the sixth preferred embodiment.

The recording medium 9 of the sixth preferred embodiment comprises: the glass substrate 115; a magnetic recording layer 149 formed on the glass substrate 115 and including the concentrically arranged outer and inner peripheral track bands 111 and 112 constituting the recording band 113; and a data recording layer 150 constituting the recording pit row 110 and deposited on the magnetic recording layer 149. As in the fifth preferred embodiment, the outer peripheral track band 111, the inner peripheral track band 112 and the corresponding recording pit row 110 therebetween constitute one annular recording band 113. The recording surface has a multiplicity of such recording bands 113 radially spaced a predetermined spacing apart from each other.

Figure 30:
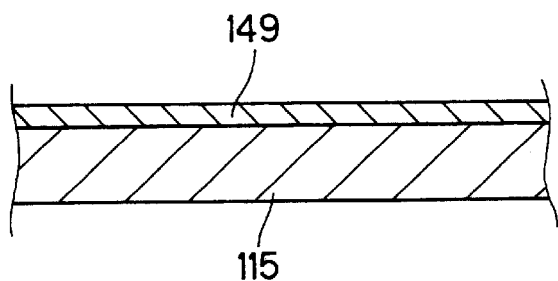
FIGS. 30 through 32 illustrate the manufacturing steps of the recording medium.

The recording medium 9 of the sixth preferred embodiment is manufactured, for example, by a method to be described below. With reference to FIG. 30, a tellurium-based magnetic material having a predetermined thickness, e.g. 200 nm, is deposited on one surface of the glass substrate 115 by a sputtering process, to form the magnetic recording layer 149.

Figure 31:
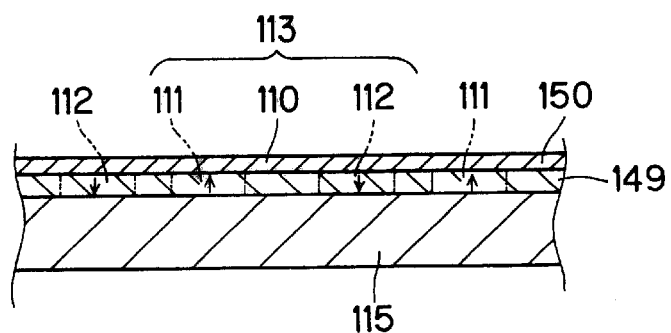

Next, with reference to FIG. 31, a photochromic material having a predetermined thickness, e.g. 80 nm, is deposited on the magnetic recording layer 149 by a spin coating process, to form the data recording layer 150.

Thereafter, the outer and inner peripheral track bands 111 and 112 differing in the direction of magnetization are formed in predetermined spaced relationship in the magnetic recording layer 149 in a manner described in the fifth preferred embodiment. At this time, part of the data recording layer 150 corresponding to part of the magnetic recording layer 149 between the outer and inner peripheral track bands 111 and 112 is formed as the recording pit row 110.

The recording/reproducing apparatus 1 of the sixth preferred embodiment is similar in construction to that of the fifth preferred embodiment. The use of a wavelength range which is not absorbed by the data recording layer 150 for the laser light emitted from the tracking light source 136 ensures a sufficient amount of transmitted light.

The sixth preferred embodiment constructed as above described produces effects similar to those of the fifth preferred embodiment, and also has the advantages of reducing the number of manufacturing steps and manufacturing costs in the manufacture of the recording medium 9.

Additionally, the recording medium 9 of the sixth preferred embodiment has a multi-layer structure comprising the magnetic recording layer 149 and the data recording layer 150. Thus, if the track bands 111 and 112 slightly overlap the recording pit row 110 as viewed in the direction in which the layers 149 and 150 are stacked, the width of the recording pit row 110 is ensured without problems. Therefore, the slightly overlapping relation between the track bands 111, 112 and the recording pit row 110 is permitted to achieve higher-accuracy tracking.

In the recording medium 9, any one of the magnetic recording layer 149 and the data recording layer 150 may be used as an upper layer, or overlie the other. When the data recording layer 150 is the upper layer, the magnetic recording layer 149 is protected. When the magnetic recording layer 149 is the upper layer, a signal having a high signal-to-noise ratio is provided. The laser light which reaches the upper layer propagates to reach the lower layer, and functions as the tracking light or the recording/reproducing light depending on whether the lower layer is the magnetic recording layer 149 or the data recording layer 150.

Figure 32:
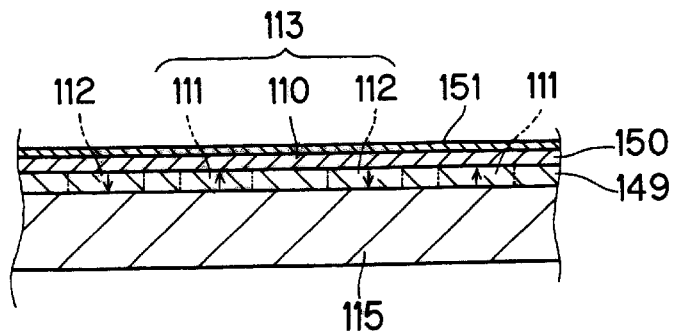

As required, a protective layer 151 made of SiO$_2$ and having a thickness of 20 nm may be deposited on the surface of the data recording layer 150, as shown in FIG. 32.

7. Seventh Preferred Embodiment

Figure 33:
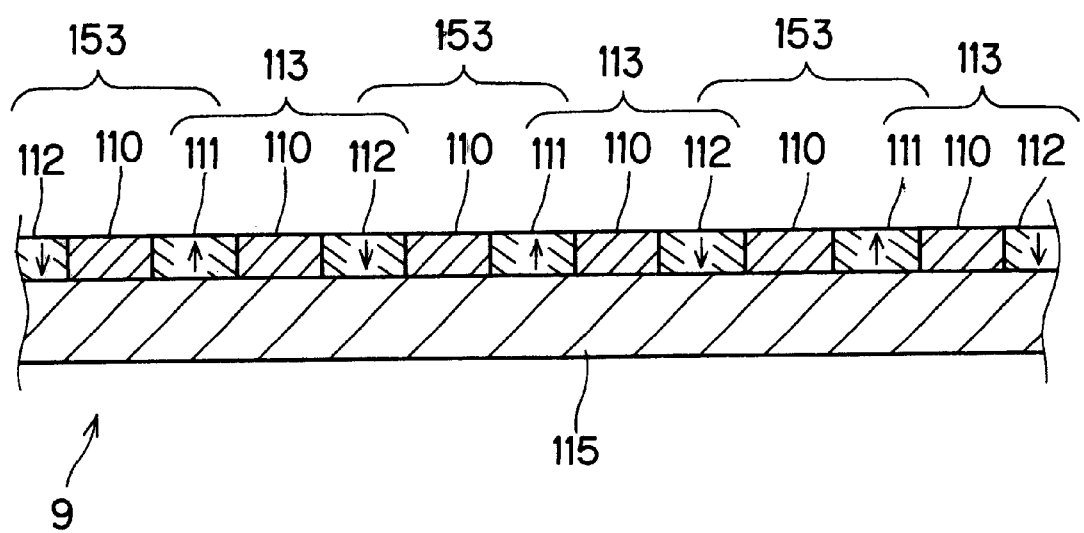
FIG. 33 is a cross-sectional view of the recording medium according to a seventh preferred embodiment of the present invention.

FIG. 33 shows the recording medium 9 according to a seventh preferred embodiment of the present invention. Components similar to those of the above-mentioned preferred embodiments are designated by the same reference numerals and characters, and the description thereon will be omitted in the seventh preferred embodiment.

The recording medium 9 of the seventh preferred embodiment comprises the outer and inner peripheral track bands 111 and 112 arranged alternately radially in constantly spaced apart relationship. A portion between the outer and inner peripheral track bands 111 and 112 is defined as the recording pit row 110.

In the seventh preferred embodiment, an additional recording pit row 110 is also provided between adjacent recording bands 113 of the above-mentioned preferred embodiments each comprised of the outer peripheral track band 111, the recording pit row 110 and the inner peripheral track band 112. The recording surface further includes a multiplicity of annular recording bands 153 radially spaced and each comprising the inner peripheral track band 112 located on the outside, the outer peripheral track band 111 located on the inside, and the additional recording pit row 110 located therebetween.

The tracking control in the seventh preferred embodiment may be performed by judging the direction of the deviation of the optical head 104, based on the tracking information during tracking regarding the direction of rotation of the plane of polarization of the reflected light in combination with track position identification information. Specifically, the directions of magnetization on the outer and inner peripheries of the recording pit row 110 in the recording band 113 are opposite from those in the recording band 153. Therefore, the respective planes of polarization of the reflected light in the recording band 113 and in the recording band 153 rotate in the opposite directions if the optical head 104 is deviated in the same direction.

Thus, the tracking control is performed, for example, in a manner to be described below. If the track position identification information indicates an odd number, the tracking control described in the first or sixth preferred embodiment is performed in accordance with the direction of rotation of the plane of polarization of the reflected light. If the track position identification information indicates an even number, the optical head 104 is controlled to be driven in the direction opposite from the direction in which the optical head 104 is moved during the tracking control described in the first or sixth preferred embodiment.

The structure of the seventh preferred embodiment which comprises the additional recording pit row 110 between adjacent recording bands 113 can record or reproduce data at a still higher density.

8. Eighth Preferred Embodiment

Figure 34:
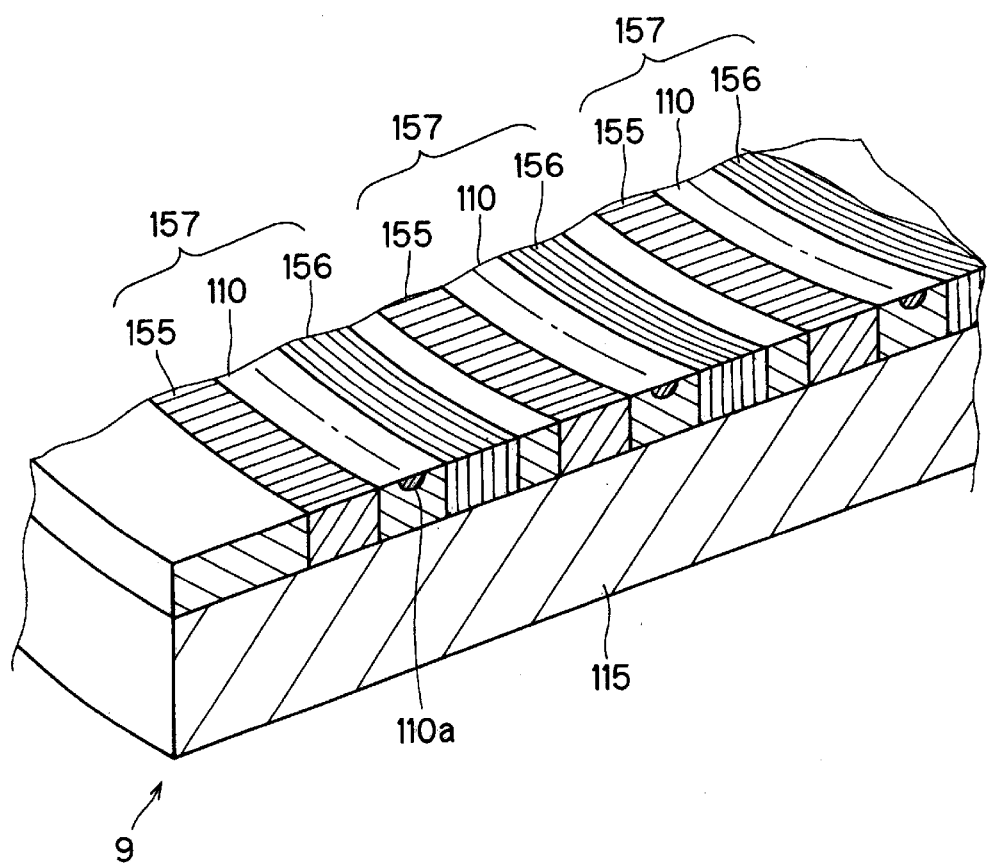
FIG. 34 is a perspective view, partly in cross section, of the recording medium according to an eighth preferred embodiment of the present invention.

FIG. 34 shows the recording medium 9 according to an eighth preferred embodiment of the present invention. Components similar to those of the above-mentioned preferred embodiments are designated by the same reference numerals and characters, and the description thereon will be omitted in the eighth preferred embodiment.

The recording medium 9 of the eighth preferred embodiment is constructed such that the outer peripheral track band on the outer periphery of the recording pit row 110 is a radial groove track band 155 including a diffraction grating groove group having radially extending grid lines arranged substantially in parallel, and the inner peripheral track band on the inner periphery of the recording pit row 110 is a circumferential groove track band 156 including a diffraction grating groove group having concentrically circumferentially extending grid lines arranged substantially in parallel. The recording medium 9 comprises a multiplicity of radially spaced annular recording bands 157 each including the recording pit row 110, and the radial groove track band 155 and circumferential groove track band 156 which are on the opposite sides of the recording pit row 110.

The radial groove track band 155 and the circumferential groove track band 156 have a polarization-dependent microstructure, and a grid structure having irregularities on the order of magnitude of wavelength has a polarization property.

When TE polarized light and TM polarized light with respect to the grid direction are directed as the tracking illumination light onto the recording medium 9, the diffraction efficiency of each polarized light component changes in accordance with the direction of grid vectors. Therefore, by splitting the reflected light into polarized light components, the grid direction of the polarized light components is detected from the ratio between the diffraction efficiencies of the polarized light components. This is used to detect whether the optical head 104 is deviated toward the outer or inner periphery during the tracking control.

Thus, the use of the microstructure in place of the magnetized patterns for the outer and inner peripheral track bands 111 and 112 of the recording medium 9 allows the manufacture of an original master of the recording medium 9 by a photolithographic technique and the transfer of the microstructure to the original master by injection molding. This is advantageous in very high mass-productivity of the recording medium 9.

9. Modifications

The present invention is not limited to the above description of the first to eighth preferred embodiments.

For example, the recording medium 9 according to the first to eighth preferred embodiments includes, but not limited to, the concentric recording bands. The present invention is applicable to a recording medium having recording bands arranged in a spiral pattern. Further, the recording medium need not be removable, but may be fixed to the recording/reproducing apparatus 1. Furthermore, the apparatus 1 includes, but not limited to, the structure utilizing the near-field light.

Although each recording band of the recording medium 9 includes the outer peripheral track band 91, the recording region 9b, and the inner peripheral track band 93 as shown in FIG. 5 in the above-mentioned preferred embodiments, the track bands may be shared between adjacent ones of the recording bands when the concentric recording bands are used. Specifically, the outer peripheral track band 91 of a given recording band is used also as the inner peripheral track band 93 of a recording band adjacent to and external of the given recording band. Such an arrangement requires one track band to be provided between adjacent two recording pit rows 92 to enable higher-density recording on the recording medium 9. However, in the case of the tracking control in accordance with the amount of the reflected tracking illumination light, the outer and inner peripheral track bands differ in reflection pattern depending on track positions, and it is hence necessary that the tracking controller manages where the track being subjected to the recording or reproduction is positioned.

In the above description, the near-field light generator device 20 or the like is used as the near-field optical means which generates the near-field light 20a and detects the near-field light 20a reflected from the recording medium 9. The present invention, however, is not limited to this. For example, another arrangement may be used in which an additional means for directing light onto the backside of the recording medium 9 is provided, and the near-field optical means is disposed in close proximity to a predetermined near-field region to detect near-field light generated between the recording medium 9 and the near-field optical means.

Additionally, although the light reflected from the recording medium 9 is detected through the fiber probe 105, the apparatus 1 may comprise a detection head disposed in another position for detecting the light reflected from the recording medium 9, to perform the tracking control.

Although the wavelength-selective beam splitters 130 and 131 are used, the apparatus 1 may comprise beam splitters having no wavelength-dependence and wavelength selection filters which precede the photodetectors 134, 144 and 145, instead of the beam splitters 130 and 131.

As in the above-mentioned preferred embodiments and modifications, the formation of the two types of track bands differing in optical property (more particularly, optical response property) on the opposite side of each recording pit row allows high-accuracy tracking control.

While the invention has been described in detail, the foregoing description is in all aspects illustrative and not restrictive. It is understood that numerous other modifications and variations can be devised without departing from the scope of the invention.

What is claimed is:

1. A recording medium on which a light spot is to be projected and scanned comprising:
   a recording region for recording a recording pit row, the recording region being tracked;
   a first track band for tracking control of the light spot, the first track band being provided along said recording region; and
   a second track band for tracking control of the light spot, the second track band being provided along said recording region on the opposite side of said recording region from said first track band, said second track band having an optical responsivity different from that of said first track band,
   wherein the light spot falls on the recording region, the first track band and the second track band concurrently.

2. The recording medium according to claim 1,
   wherein said first track band has a predetermined first reflectivity, and said second track band has a second reflectivity different from said first reflectivity.

3. The recording medium according to claim 2,
   wherein said recording region has a reflectivity which is between said first reflectivity and said second reflectivity.

4. The recording medium according to claim 1,
   wherein said first track band has track pits arranged at a first spacing, and said second track band has track pits arranged at a second spacing different from said first spacing.

5. The recording medium according to claim 1,
   wherein said first track band and said second track band have a property of absorbing respectively different wavelength ranges.

6. The recording medium according to claim 1,
   wherein said recording region, said first track band, and said second track band are arranged concentrically.

7. The recording medium according to claim 1,
   wherein said first track band is a first magnetized pattern row magnetized in a fixed direction, and said second track band is a second magnetized pattern row magnetized in a direction different from the direction of magnetization of said first magnetized pattern row.

8. The recording medium according to claim 7,
   said recording medium having a multilayer structure comprising a magnetic recording layer including said first and second magnetized pattern rows, and a data recording layer including said recording pit row.

9. The recording medium according to claim 1,
   wherein one of said first and second track bands is a radial groove pattern row including a diffraction grating groove group having radially extending grid lines, and the other of said first and second track bands is a circumferential groove pattern row including a diffraction grating groove group having concentrically or spirally circumferentially extending grid lines in corresponding relation to said recording pit row.

10. A recording and/or reproducing apparatus for recording and/or reproducing a recording pit in or from a recording region of a recording medium on which a light spot is to be projected and scanned, where said recording region is to be tracked, said recording medium further including a first track band and a second track band for tracking control of the light spot, said recording region being disposed between said first track band and said second track band, said first track band and said second track band being different in optical responsivity from each other, said recording and/or reproducing apparatus comprising:
    a recording/reproducing light illumination device for directing at least one of a recording light and a reproducing light onto said recording region; and
    a tracking light illumination device for directing a tracking light onto said recording medium, said tracking light allowing said first track band and said second track band to be included in an illumination area thereof while tracking the recording region.

11. The recording and/or reproducing apparatus according to claim 10, wherein said tracking light has a diameter greater than that of said reproducing light.

12. The recording/reproducing apparatus according to claim 10,
    wherein said tracking light illumination device renders said tracking light coaxial with said reproducing light from said reproducing light illumination device to direct said tracking light onto said recording medium.

13. The recording/reproducing apparatus according to claim 10,
    wherein said reproducing light illumination device and said tracking light illumination device are formed integrally with each other.

14. The recording and/or reproducing apparatus according to claim 10, further comprising:
    signal detection means for detecting said tracking light reflected from said recording medium; and
    control means for performing tracking control in accordance with a result of detection from said signal detection means.

15. The recording/reproducing apparatus according to claim 14, wherein said signal detection means detects the amount of said tracking illumination light reflected from said recording medium.

16. The recording/reproducing apparatus according to claim 15, wherein said control means judges that said reproducing light illumination device is in an on-track state when said amount of said tracking illumination light reflected from said recording medium which is detected by said signal detection means is between two predetermined threshold values.

17. The recording/reproducing apparatus according to claim 14, wherein said signal detection means detects a variation in the amount of said tracking illumination light with a predetermined first cycle, and a variation in the amount of said tracking illumination light with a predetermined second cycle.

18. The recording/reproducing apparatus according to claim 17, wherein said control means judges that said reproducing light illumination device is in an on-track state when a difference between said variation with said first cycle and said variation with said second cycle is between an upper limit and a lower limit.

19. The recording/reproducing apparatus according to claim 10, further comprising:

signal detection means for detecting a predetermined wavelength component of said tracking illumination light transmitted through said recording medium; and control means for performing tracking control in accordance with a result of detection from said signal detection means.

20. The recording/reproducing apparatus according to claim 14, wherein said tracking illumination light is linearly polarized, and wherein said signal detection means detects a direction of rotation of a plane of polarization of said tracking illumination light reflected from said recording medium.

* * * * *